United States Patent
Imabayashi et al.

(10) Patent No.: US 6,359,789 B1
(45) Date of Patent: Mar. 19, 2002

(54) HETEROGENEOUS FUNCTIONS-INTEGRATED COMMUNICATION DEVICE

(75) Inventors: Hirofumi Imabayashi; Kenji Joko; Takashi Shirakami, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/606,474

(22) Filed: Jun. 29, 2000

(30) Foreign Application Priority Data

Oct. 15, 1999 (JP) .......................................... 11-293464

(51) Int. Cl.[7] .............................. H05K 7/00; H04B 1/08
(52) U.S. Cl. ....................... 361/796; 361/730; 361/801; 361/825; 361/826; 385/136
(58) Field of Search ................................ 361/728–730, 361/747, 752, 753, 759, 796, 797, 801, 803, 823, 825, 826; 174/97, 68.1, 68.3; 385/134–136

(56) References Cited

U.S. PATENT DOCUMENTS

| | | | |
|---|---|---|---|
| 5,023,404 A | * 6/1991 | Hudson et al. | 174/97 |
| 5,265,186 A | * 11/1993 | Fishkin et al. | 385/135 |
| 5,708,742 A | * 1/1998 | Beun et al. | 385/53 |
| 5,740,300 A | * 4/1998 | Hodge | 385/135 |
| 5,956,449 A | * 9/1999 | Otani et al. | 385/134 |

FOREIGN PATENT DOCUMENTS

| | | |
|---|---|---|
| JP | 2000-56177 | 2/2000 |
| JP | 2000-134646 | 5/2000 |

* cited by examiner

Primary Examiner—Jayprakash N. Gandhi
(74) Attorney, Agent, or Firm—Rosenman & Colin LLP

(57) ABSTRACT

A heterogeneous functions-integrated communication device which is improved in the efficiency of optical connector connection/disconnection work and which enables non-redundant arrangement without the need to increase the size of the device. Those DS3 interface connectors of a customer interface section which are required only in the non-redundant arrangement are mounted on an expansion shelf, whereby the size of a shelf body is reduced and, in the case of redundant arrangement, the expansion shelf may be detached. Optical fibers can be introduced at a front side of the device from obliquely below to plug-in units, so that the optical fibers can be connected/disconnected without the need to pull out the plug-in units. Also, fiber trays are arranged at center and bottom levels, respectively, with respect to the height of the shelf body, and an upper part of each fiber tray is made smaller in width than a lower part thereof to thereby define a longitudinal opening, so that the optical fibers extending from the plug-in units can be introduced into the respective fiber trays through the openings.

8 Claims, 28 Drawing Sheets

HETEROGENEOUS FUNCTIONS-INTEGRATED COMMUNICATION DEVICE

BACKGROUND OF THE INVENTION (1) Field of the Invention

The present invention relates to a heterogeneous functions-integrated communication device, and more particularly, to a heterogeneous functions-integrated communication device improved in the handling efficiency of a customer interface section thereof and capable of saving space.

It is essential for recent communication systems to furnish an existing SONET (Synchronous Optical NETwork) system with ATM (Asynchronous Transfer Mode)/LAN (Local Area Network) functions, and also to ensure affinity and compatibility with the existing network (SONET), as well as flexibility to permit new functions to be added to required networks.

In communication devices having such functions, it is often necessary that a customer interface section having conventional SONET functions should be expanded/added, and also that a customer interface section having new ATM/LAN functions should be given multichannel support.

(2) Description of the Related Art

FIG. 26 shows the arrangement of a conventional optical multiplex communication device by way of example. The optical multiplex communication device 1 comprises two printed board shelves 3 having respective opposite sides thereof attached to a pair of posts 2, and printed board units 4 received in the printed board shelves 3 and plugged therein. The upper printed board shelf 3 constitutes a multiplexing section while the lower printed board shelf 3 constitutes a separating section, and in the illustrated example, up to 16 units can be inserted into each shelf. As the number of communication lines increases, additional printed board shelves 3 may be stacked, thus forming an increased number of shelves.

In FIG. 26 is shown a state in which the leftmost printed board units 4 are pulled out from the respective printed board shelves 3. An optical signal processing circuit, an electrical signal-to-optical signal conversion device, an optical signal-to-electrical signal conversion device, etc. are mounted on the printed board unit 4, but are omitted from the figure for simplicity of illustration.

Optical fibers 5 from the outside of the device need to be detachably connected to respective internal optical fibers 6 of each printed board unit 4 by means of optical connectors, and to this end, a plurality of (in the figure, four) optical connector adapters 7 are mounted in parallel by a fitting 8 on a printed board surface close to the front thereof.

The top of each printed board shelf 3 constitutes a fiber tray 9, on which excess portions 10 of the optical fibers 5 introduced to the printed board units 4 are placed, forming loops.

Let it here be assumed that circuitry corresponding to the required number of lines is mounted on each printed board unit 4, and also that as many optical connector adapters 7 are attached thereto. On the site where the communication device is installed, connection/disconnection of the optical connectors of the external optical fibers 5 is carried out at locations where the corresponding optical connector adapters 7 are situated.

When the optical connector is to be connected or disconnected, the printed board unit 4 needs to be pulled out from the printed board shelf 3 as illustrated in the figure so that the printed board unit can be seen from outside, to permit connection/disconnection of the optical connector from one side, and after the connection/disconnection work is finished, the printed board unit 4 needs to be again inserted into the printed board shelf 3. At this time, since the optical connector to be connected or disconnected is moved, the excess portion 10 of the corresponding optical fiber 5 on the fiber tray 9 is extended for a certain length, and after the work is finished, the optical fiber is restored to its original state. How the optical connector is connected/disconnected will be explained with reference to FIGS. 27 and 28.

FIGS. 27 and 28 are sectional side views of a principal part of the communication device, showing states in which the printed board unit is received and pulled out, respectively. In the figures, various circuit elements mounted on the printed board unit 4 are omitted, except for the optical connector adapters 7 and the fitting 8 therefor. Also, in the figures, the left side corresponds to the front of the device, and the right side corresponds to the rear (back) of the device.

Guide grooves, not shown, are cut in upper and lower inside surfaces of the printed board shelf 3, for guiding the printed board unit 4 when the unit is moved back and forth. A back board 11, which comprises a printed board, is attached to the back of the printed board shelf 3 and has back board-side connectors 12 mounted thereon.

The printed board unit 4 has a face plate 13 attached to the front thereof, upper and lower tabs 14 for inserting/pulling the unit, a stopper 15 situated at a lower portion of the unit close to the back thereof, and printed board unit-side connectors 16 attached to the back of the unit. The printed board unit 4 is inserted into the printed board shelf 3, whereupon the printed board unit-side connectors 16 are plugged into and thus connected to the respective back board-side connectors 12.

The external optical fibers 5 extend from the back of the device toward the front of the same in a manner such that the excess portions 10 thereof are looped on the fiber tray 9, and are introduced into the printed board unit 4 from the front thereof. The lead-in portions of the optical fibers 5 are bundled with bundling bands 17 and are fixed to the front face of the printed board unit 4 so that they cannot be moved.

Not only when the communication device is installed but also when the number of lines is changed or inspection is made in case of fault, optical connectors 18 need to be connected to or disconnected from the optical connector adapters 7 of the printed board unit 4 received in the printed board shelf 3. In such cases, first, the tabs 14 are moved to pull out the printed board unit 4 from the printed board shelf 3. When the printed board unit 4 is pulled out, its stopper 15 comes into engagement with a front fitting of the printed board shelf 3, and accordingly, the printed board unit is pulled out up to the illustrated position. With the optical connector adapters 7 drawn out of the printed board shelf 3 in this manner, the optical connectors 18 are connected or disconnected, and after the connection/disconnection work is finished, the optical connector adapters 7 are put back into the printed board shelf 3. When the optical connector adapters 7 are drawn out of the printed board shelf 3, the looped excess portions 10 are extended and removal or reattachment of the bundling bands 17 is performed at the same time.

Let it be assumed that, in the optical multiplex communication device 1 constructed as described above, a customer interface section of low-order group has a maximum of 12 mounting slots, for example. These slots permit interface printed board units having any one of three heterogeneous functions to be mounted thereto. Specifically, printed board units having a DS1 (digital signal level 1) interfacing function, a DS3 (digital signal level 3) interfacing function or a LAN interfacing function can be mounted to the slots.

Where a maximum number of printed board units are mounted to the customer interface section, the DS1 interface has a capacity of 168 channels if one printed board unit can accommodate 14 channels, the DS3 interface has a capacity of 36 channels if one printed board unit can accommodate three channels, and the LAN interface has a capacity of 24 channels if one printed board unit can accommodate two channels. It is also necessary that external line connectors for such interface which are equal in number to the maximum number of channels should be mounted to the back of the device.

The DS3 interface printed board units can be used in two different ways, depending on whether they constitute a redundant or non-redundant arrangement.

In the case of redundant arrangement, provided that current and standby systems are in the ratio 1:1, six DS3 interface printed board units are used for each of the current and standby systems. Specifically, DS3 interface printed board units are mounted in pairs to the printed board shelf 3 in such a manner that two DS3 interface printed board units, one for the current system and the other for the standby system, occupy two adjacent slots. In this case, since one printed board unit has a capacity of three channels, the six pairs of DS3 interface printed board units accommodate a total of 18(=3×6) channels. Accordingly, 36 interface connectors are required for input/output purposes, and these 36 interface connectors are arranged at the back of the optical multiplex communication device 1.

In the case of non-redundant arrangement, a maximum of 12 DS3 interface printed board units are all used for the current system. Thus, where 12 DS3 interface printed board units are mounted, a total number of channels is 36(=3×12). It is therefore necessary that 72 interface connectors, twice as many as the number of interface connectors required in the case of redundant arrangement, should be provided for input/output purposes.

Each time the work of connecting/disconnecting optical connectors is performed, however, the printed board unit must be pulled out from the printed board shelf, and since the printed board unit-side connectors become disconnected from the back board-side connectors as the printed board unit is pulled, the operation of the circuitry on the printed board unit stops. Further, labor-consuming handling of the excess portions of the optical fibers is required, lowering the working efficiency.

In connection with the mounting of DS3 interface printed board units, the number of DS3 interface connectors to be provided in the communication device varies by twice, depending upon whether the arrangement to be employed is redundant or non-redundant. To enable both arrangements, therefore, the required number of connectors to be provided in the communication device should be equal to the number of connectors needed in the case of non-redundant arrangement, giving rise to a problem that the size of the shelf must be increased correspondingly.

SUMMARY OF THE INVENTION

An object of the present invention is to provide a heterogeneous functions-integrated communication device which ensures high working efficiency when optical connectors are connected/disconnected and which also enables non-redundant arrangement without the need to increase the size of a shelf body.

To achieve the above object, there is provided a heterogeneous functions-integrated communication device capable of accommodating different interfaces. The heterogeneous functions-integrated communication device comprises a shelf body having a back face on which are provided a number of interface connectors required when maximum numbers of interface plug-in units of all mountable types are mounted, and an expansion shelf attached to an upper portion of the shelf body and having a number of interface connectors required only when the interface plug-in units of a specific type constitute a non-redundant arrangement for operation.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 6(A) and 6(B) illustrate environments in which the optical multiplex communication device is used, wherein FIG. 6(A) shows a case where the device is installed in a remote cabinet, and FIG. 6(B) shows a case where the device is installed in a central office;

FIGS. 7(A) and 7(B) are plan views of the optical multiplex communication device, wherein FIG. 7(A) shows a case where the device is installed in a remote cabinet, and FIG. 7(B) shows a case where the device is installed in a central office;

FIGS. 15(A) and 15(B) show a first face plate, wherein FIG. 15(A) is a front view of the first face plate, and FIG. 15(B) is a side view of the first face plate;

FIGS. 16(A), 16(B) and 16(C) show a second face plate, wherein FIG. 16(A) is a front view of the second face plate, FIG. 16(B) is a side view of the second face plate, and FIG. 16(C) is a plan view of the second face plate;

FIGS. 18(A), 18(B) and 18(C) show an example of the adapter holder, wherein FIG. 18(A) is a front view of the adapter holder, FIG. 18(B) is a right side view of the adapter holder, and FIG. 18(C) is a plan view of the adapter holder;

FIGS. 19(A) and 19(B) show an example of an adapter, wherein FIG. 19(A) is a partially sectional front view of the adapter, and FIGS. 19(B) is a left side view of the adapter;

FIGS. 23(A) and 23(B) are views showing an optical interface plug-in unit, wherein FIG. 23(A) shows the optical interface plug-in unit as viewed from the front of the device, and FIG. 23(B) shows the optical interface plug-in unit as viewed from one side of the device;

FIGS. 25(A) and 25(B) show details of a fiber tray, wherein FIG. 25(A) is an enlarged view of part of the fiber tray, as viewed from the front of the device, and FIG. 25(B) is a perspective view of part of the fiber tray;

DESCRIPTION OF THE PREFERRED EMBODIMENTS

An embodiment of the present invention will be hereinafter described, wherein the invention is applied, by way of example, to an optical multiplex communication device which has optical interface connectors (e.g., with the transmission rate OC-3/12/48 (Optical Carrier level 3/12/48)) of a customer interface section mounted on a front face thereof and which has a large number of electrical interface connectors (DS1/DS3/LAN) mounted on a back face thereof.

Figure 1:
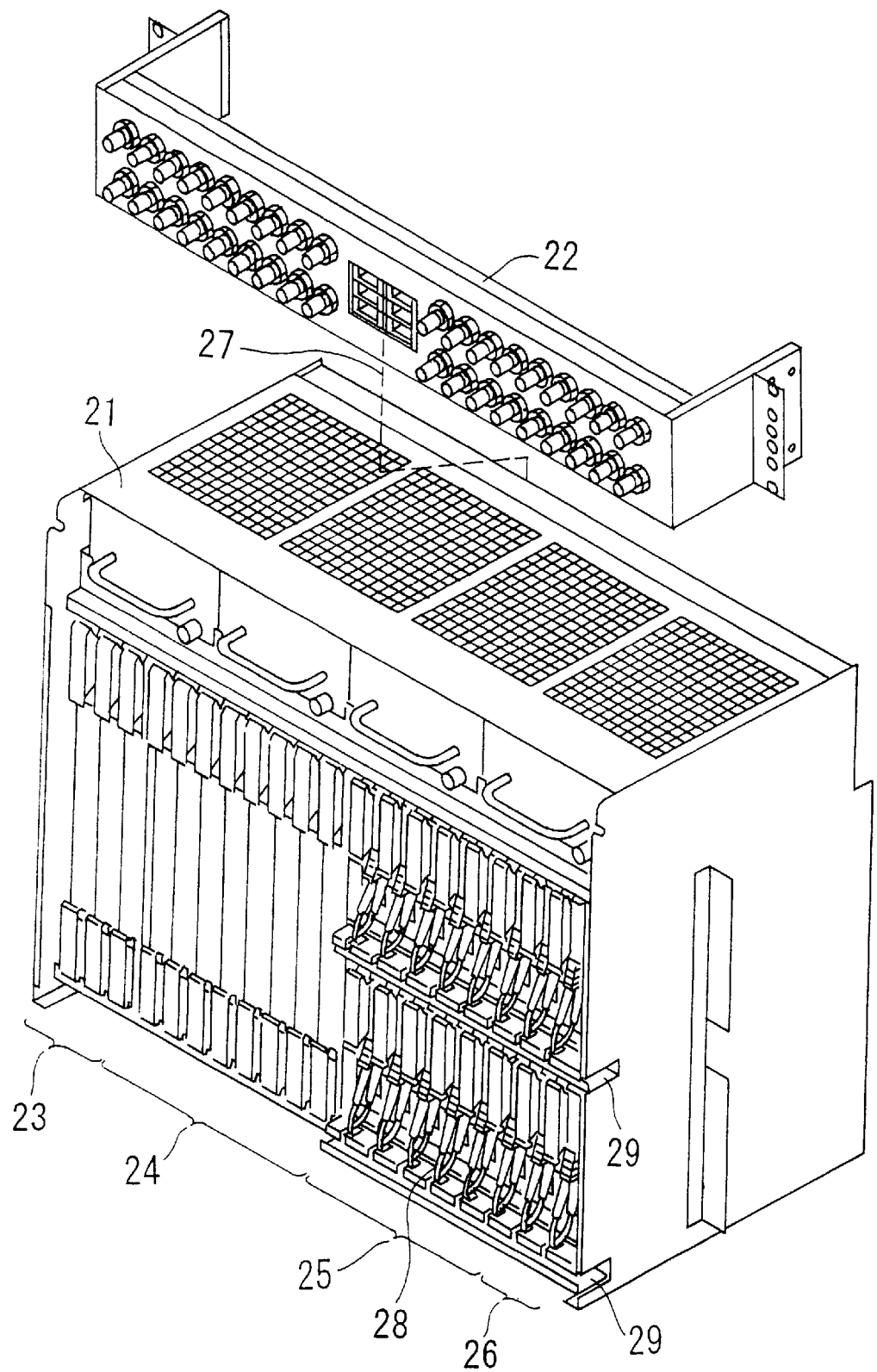
FIG. 1 is a schematic view showing the external appearance of an optical multiplex communication device according to the present invention.

FIG. 1 schematically illustrates the external appearance of the optical multiplex communication device according to the present invention. This communication device, which is a heterogeneous functions-integrated type, comprises a shelf body 21 and an expansion shelf 22. The shelf body 21 has a plurality of slots at its front to permit plug-in units to be mounted thereto, and these slots are assigned the function as a supervisory control section 23, the function as a switching section 24, the function as a customer interface section 25, and the function as a transport section 26. In the customer interface section 25, DS1 interface plug-in units may be mounted if DS1 signal interfacing is required, DS3 interface plug-in units may be mounted if DS3 signal interfacing is required, and LAN interface plug-in units may be mounted if LAN interfacing is required. Accordingly, DS1 interface connectors, DS3 interface connectors and LAN interface connectors, not shown, are provided at the back of the shelf body 21.

However, the number of the DS3 interface connectors provided at the back of the shelf body 21 just equals the number necessary to constitute a redundant arrangement. Non-redundant arrangement requires DS3 interface connectors twice as many as the number needed in the case of redundant arrangement, and such additionally required connectors are arranged on the expansion shelf 22. The expansion shelf 22 is separably connected to the shelf body 21 by means of a DS3 connecting cable 27. Accordingly, in cases where the DS3 interface plug-in units constitute a redundant arrangement for operation, the DS3 interface connectors provided on the shelf body 21 suffice, so that the expansion shelf 22 may be detached from a rack.

Each interface plug-in unit mounted to the customer interface section 25 is constructed such that optical fibers 28 are introduced into the unit from its front side. Specifically, the interface plug-in unit has a cutout formed in the front thereof and extending obliquely downward, thus permitting connector adapters arranged in the cutout to be accessed from obliquely below and to be connected to respective optical fiber connectors. Fiber trays 29 are formed at center and bottom levels with respect to the height of the shelf body 21, that is, beneath the openings of two shelves to which interface plug-in units are mounted, and extend widthwise to receive optical fibers extended from the interface plug-in units. This arrangement permits optical fiber connectors to be connected to and disconnected from the interface plug-in units without the need to pull out the interface plug-in units. Also, the optical fibers need not be looped and can be put in order on the fiber trays 29.

Figure 2:
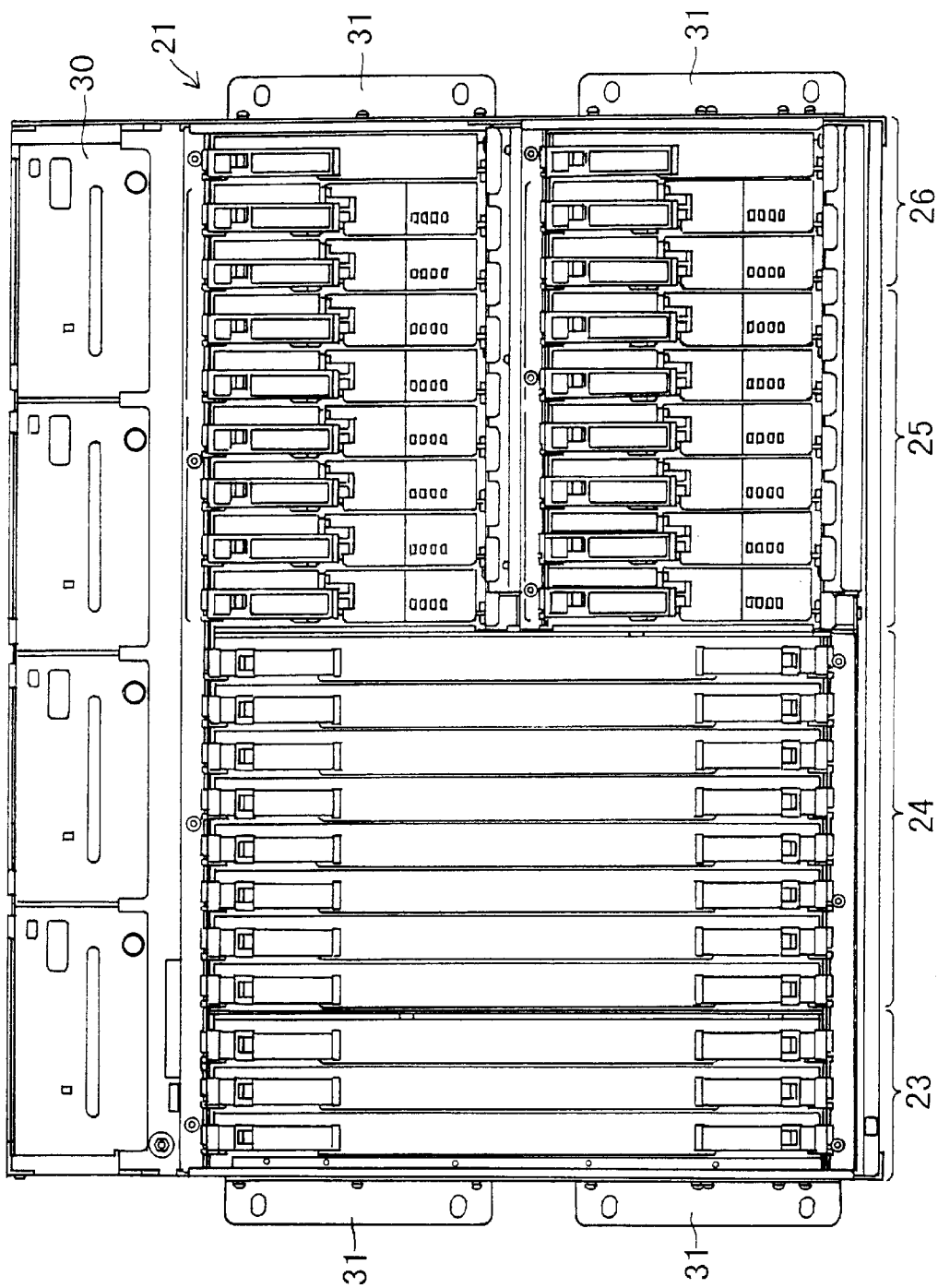
FIG. 2 is a front view of a shelf body of the optical multiplex communication device.
Figure 3:
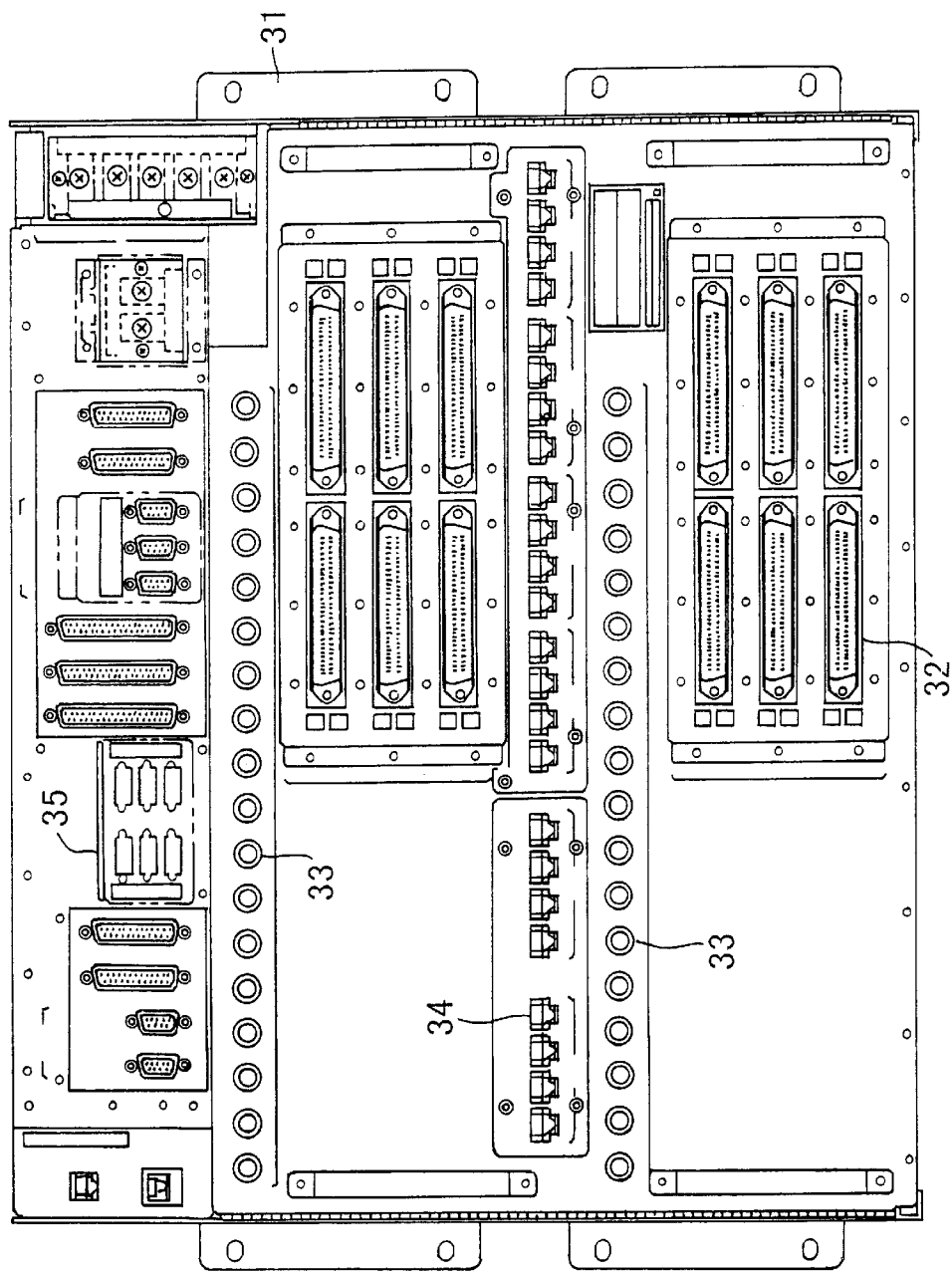
FIG. 3 is a rear view of the shelf body of the optical multiple communication device.

FIGS. 2 and 3 are a front view and a rear view, respectively, of the shelf body of the optical multiplex communication device. The shelf body 21 of the optical multiplex communication device has the supervisory control section 23 to which three plug-in units are mounted, the switching section 24 to which eight plug-in units are mounted, the customer interface section 25 constituted by two, upper and lower shelves to each of which six interface plug-in units are mounted, and the transport section 26 also constituted by two, upper and lower shelves to each of which three plug-in units are mounted, and also has four heat removing fans 30 arranged at an upper portion thereof. Further, fittings 31, by means of which the shelf body 21 is mounted to a rack, are formed at opposite sides of the shelf body.

In the customer interface section 25, DS1 interface plug-in units, DS3 interface plug-in units or LAN interface plug-in units can be mounted, and accordingly, DS1 interface connectors 32, DS3 interface connectors 33 and LAN interface connectors 34 are arranged on the back face of the shelf body 21.

In this embodiment, one DS1 interface connector 32 is associated with one DS1 interface plug-in unit, and since one DS1 interface plug-in unit has a capacity of 14 channels, a maximum number (12) of plug-in units have a capacity of 168 channels. One DS3 interface plug-in unit has a capacity of three channels, and where a maximum number (six pairs) of plug-in units are mounted so as to constitute a redundant arrangement, the number of channels is 18. Accordingly, 36 DS3 interface connectors 33 are provided for input/output purposes. In the case where non-redundant arrangement is employed, a total of 72 DS3 interface connectors 33 is required for input/output purposes, and the remaining 36 connectors are provided on the expansion shelf 22. To permit connection with the expansion shelf 22, expansion connectors 35 are arranged on the back face of the shelf body 21. One LAN interface plug-in unit has a capacity of two channels, and since a maximum number (12) of plug-in units have a capacity of 24 channels, 24 LAN interface connectors 34 are provided.

The following describes the distributions and connections of DS3 signals in cases where redundant arrangement and non-redundant arrangement are employed.

Figure 4:
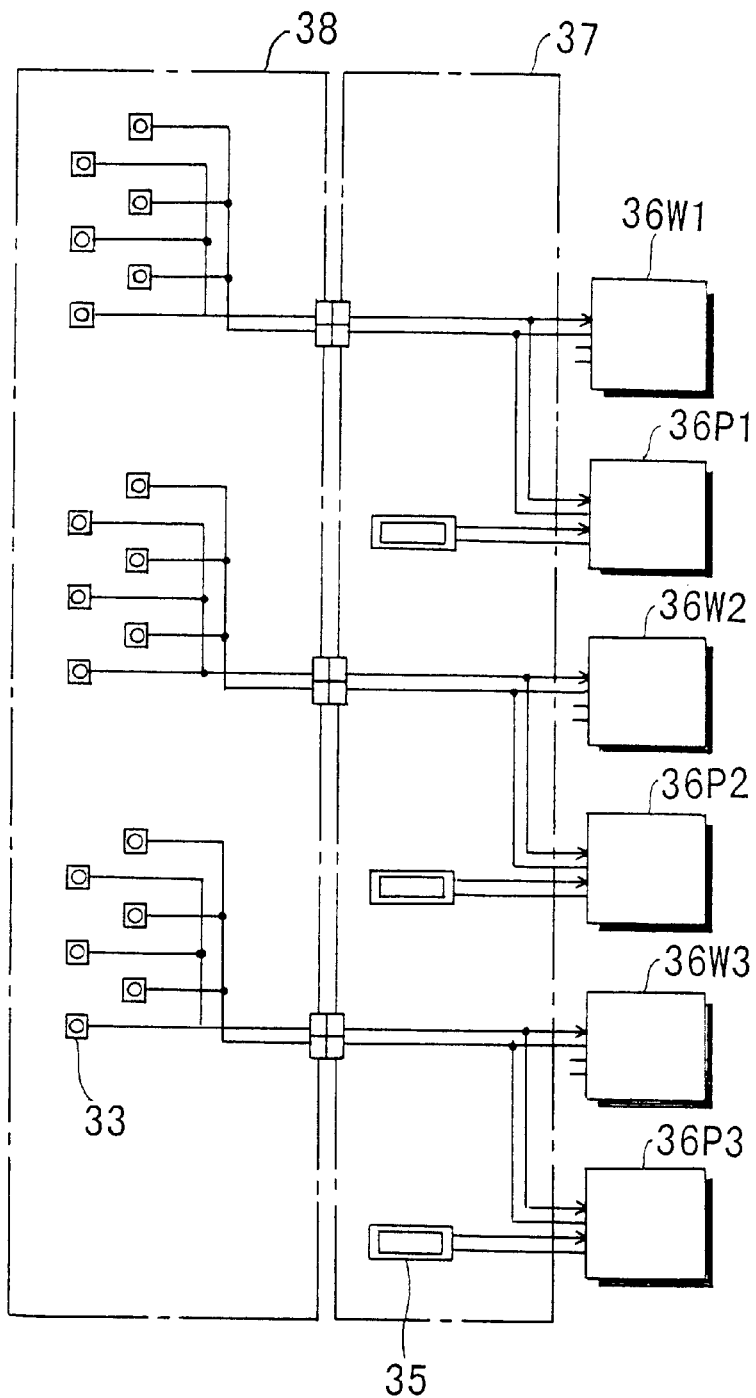
FIG. 4 is a diagram showing distributions and connections of DS3 signals in a redundant arrangement.

FIG. 4 illustrates the distributions and connections of DS3 signals in the case of redundant arrangement. The customer interface section 25 of the shelf body 21 is constituted by two, upper and lower shelves, but in the illustrated example, only one of the upper and lower shelves is shown for simplicity of illustration. Also, the figure shows, in connection with the shelf body 21, only a main back wiring board 37 arranged in the inner part of the space in which six DS3 interface plug-in units 36W1 to 36W3 and 36P1 to 36P3 are mounted, and a sub back wiring board 38 arranged on the back face of the shelf body 21. In the reference symbols 36W1 to 36W3 and 36P1 to 36P3 denoting the six DS3 interface plug-in units, "W" represents current (Working) system and "P" represents standby (Protection) system.

Each of the three pairs of DS3 interface plug-in units 36W1-36P1, 36W2-36P2 and 36W3-36P3 has a capacity of three channels and thus is connected to a total of six input/output DS3 interface connectors 33 arranged on the sub back wiring board 38.

Figure 5:
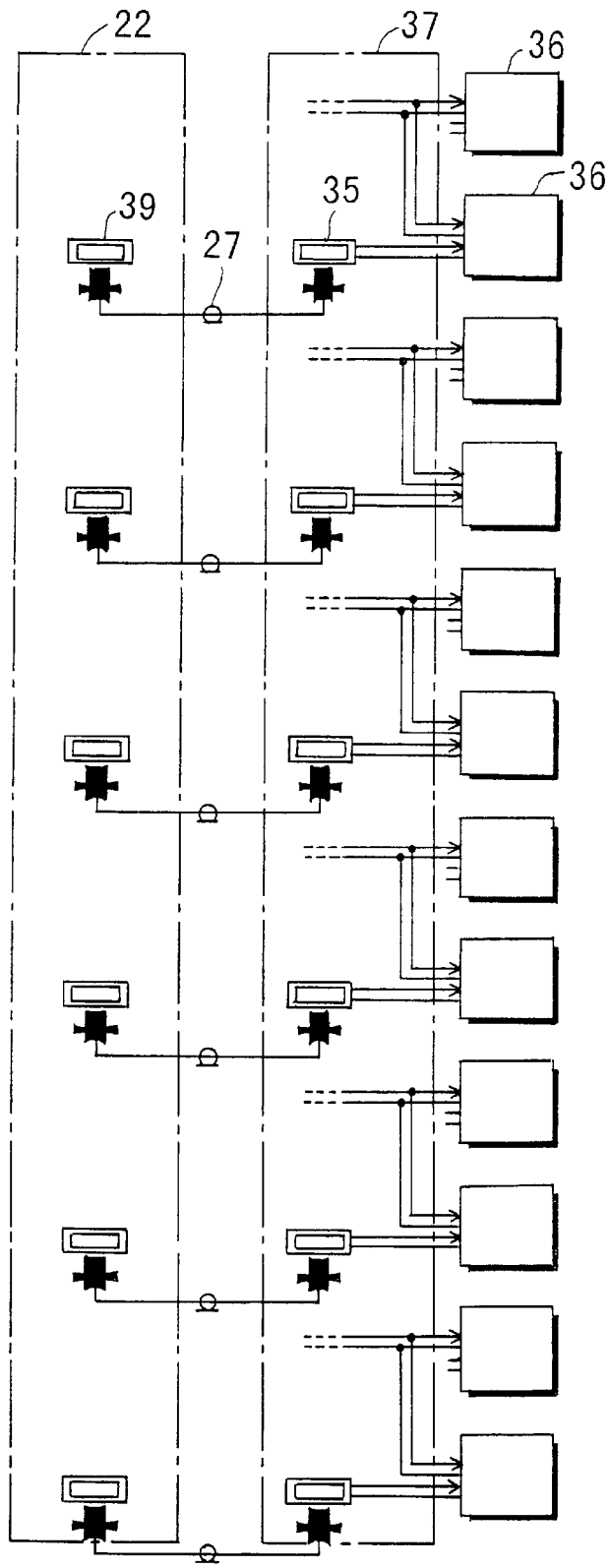
FIG. 5 is a diagram showing distributions and connections of DS3 signals in a non-redundant arrangement.

FIG. 5 illustrates the distributions and connections of DS3 signals in the case of non-redundant arrangement. In the non-redundant arrangement, all DS3 interface plug-in units 36 function as current systems. The wiring of those slots which are used for standby systems in the redundant arrangement is connected to the expansion connectors 35 arranged on the main back wiring board 37. These expansion connectors 35 are connected by the dedicated DS3 connecting cable 27, which is a thin six-core coaxial cable, to respective connectors 39 provided on the expansion shelf 22. In the expansion shelf 22, the connectors 39 are connected to 36 DS3 interface connectors.

Examples of how the expansion shelf 22 is mounted to a rack according to the installation mode of the optical multiplex communication device will be now described.

Figure 6:
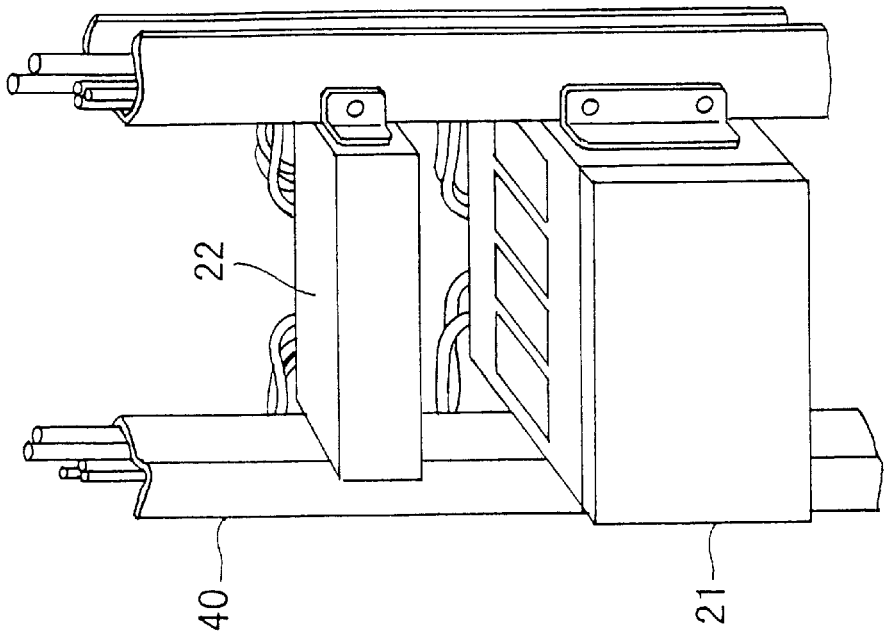
Figure 6:
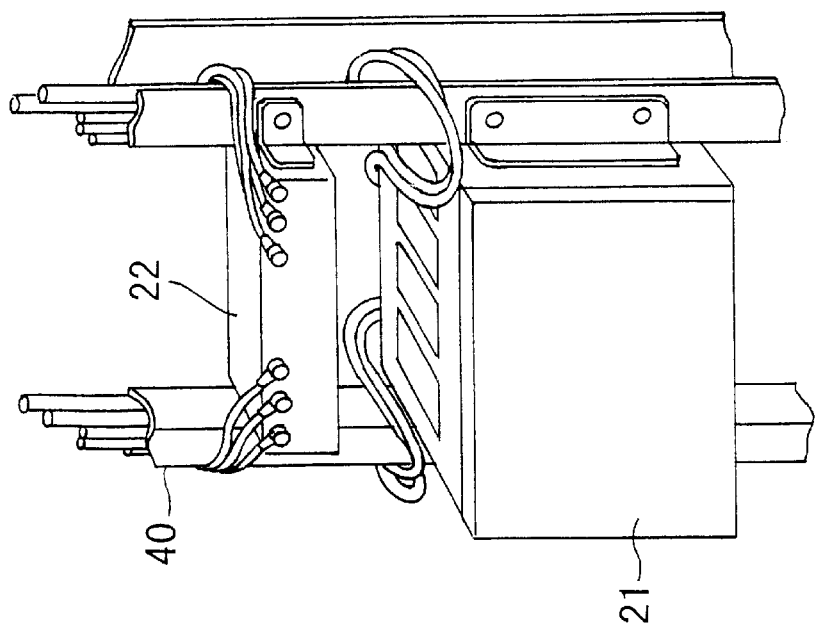

FIGS. 6(A) and 6(B) illustrate environments in which the optical multiplex communication device is used, wherein FIG. 6(A) shows a case where the device is installed in a remote cabinet, and FIG. 6(B) shows a case where the device is installed in a central office. The optical multiplex communication device may be installed inside a remote cabinet situated on a road, for example, or installed in an ordinary station in which a transmission device is arranged, that is, in a central office. In the case where the optical multiplex communication device is installed in a remote cabinet, it is difficult to access the back of the shelf body 21 because the cabinet itself is small in size, and in the case of a central office, on the other hand, access to the back of the shelf body 21 is easy.

Accordingly, especially where the customer interface section 25 is to be manipulated, the expansion shelf 22 should preferably be positioned with respect to the optical multiplex communication device already installed in a remote cabinet such that it can be manipulated on the same front side as the communication device, to thereby facilitate the manipulation. When the device is installed in a remote cabinet, therefore, the expansion shelf 22 is mounted to a rack 40 such that the DS3 interface connectors are situated in front, as shown in FIG. 6(A).

On the other hand, when the device is installed in a central office, the expansion shelf 22 is mounted to the rack 40 such that the DS3 interface connectors are situated at the back, as shown in FIG. 6(B).

Figure 7:
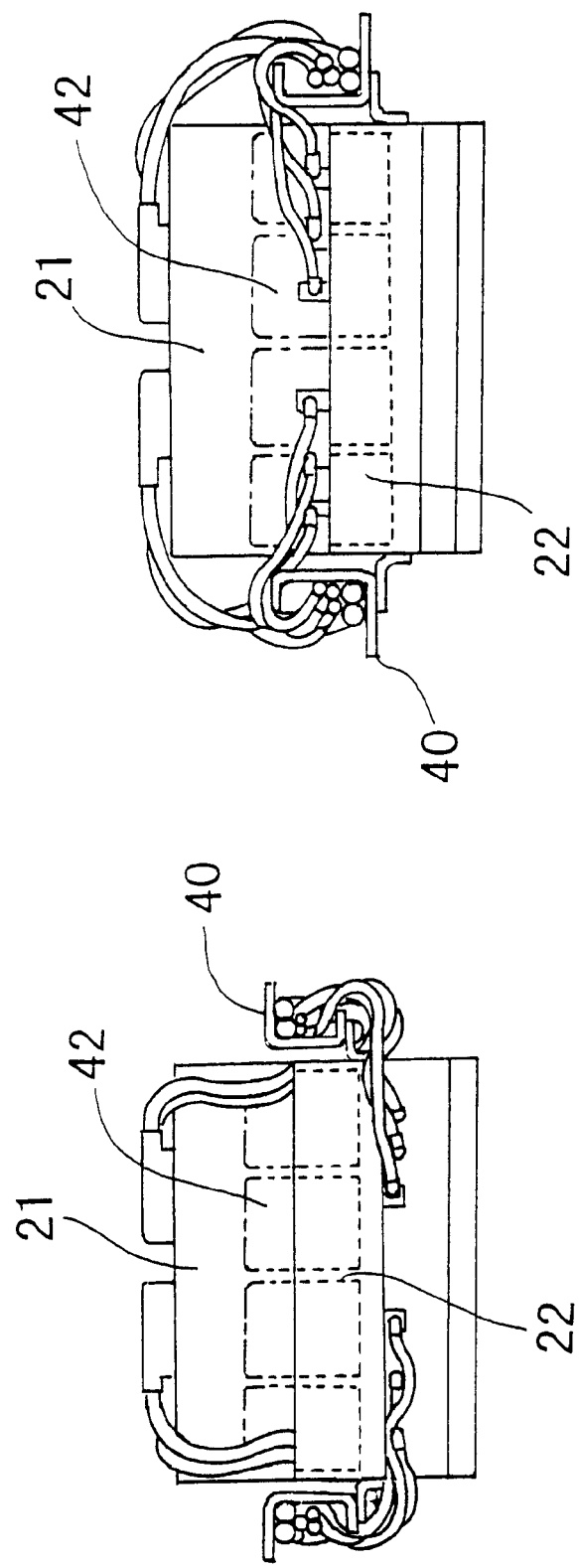

FIGS. 7(A) and 7(B) are plan views of the optical multiplex communication device, wherein FIG. 7(A) shows the device installed in a remote cabinet and FIG. 7(B) shows the device installed in a central office. The expansion shelf 22 is mounted to the rack 40 by fittings 41 fixed to opposite sides thereof as illustrated, but in different directions depending on whether the device is installed in a remote cabinet or in a central office. Accordingly, when the expansion shelf 22 is assembled, the fittings 41 are fixed to the opposite sides of the expansion shelf in different directions according to the installation mode of the optical multiplex communication device.

The expansion shelf 22 is positioned at a level higher than the shelf body 21, and since the heat removing fans 30 are arranged at an upper portion of the shelf body 21, vent holes 42 are cut in the top cover of the shelf body 21. Thus, in the case where the expansion shelf 22 is arranged at a higher level than the shelf body 21, the expansion shelf 22 should preferably not cover the vent holes 42 of the shelf body 21. The expansion shelf 22 may therefore be mounted to the rack 40 at a distance from the shelf body 21.

However, the optical multiplex communication device should preferably be small in height and compact. The following describes an example of mounting the expansion shelf 22 to the rack 40 such that the vent holes 42 of the shelf body 21 are not covered, without entailing increase in the height of the device.

Figure 8:
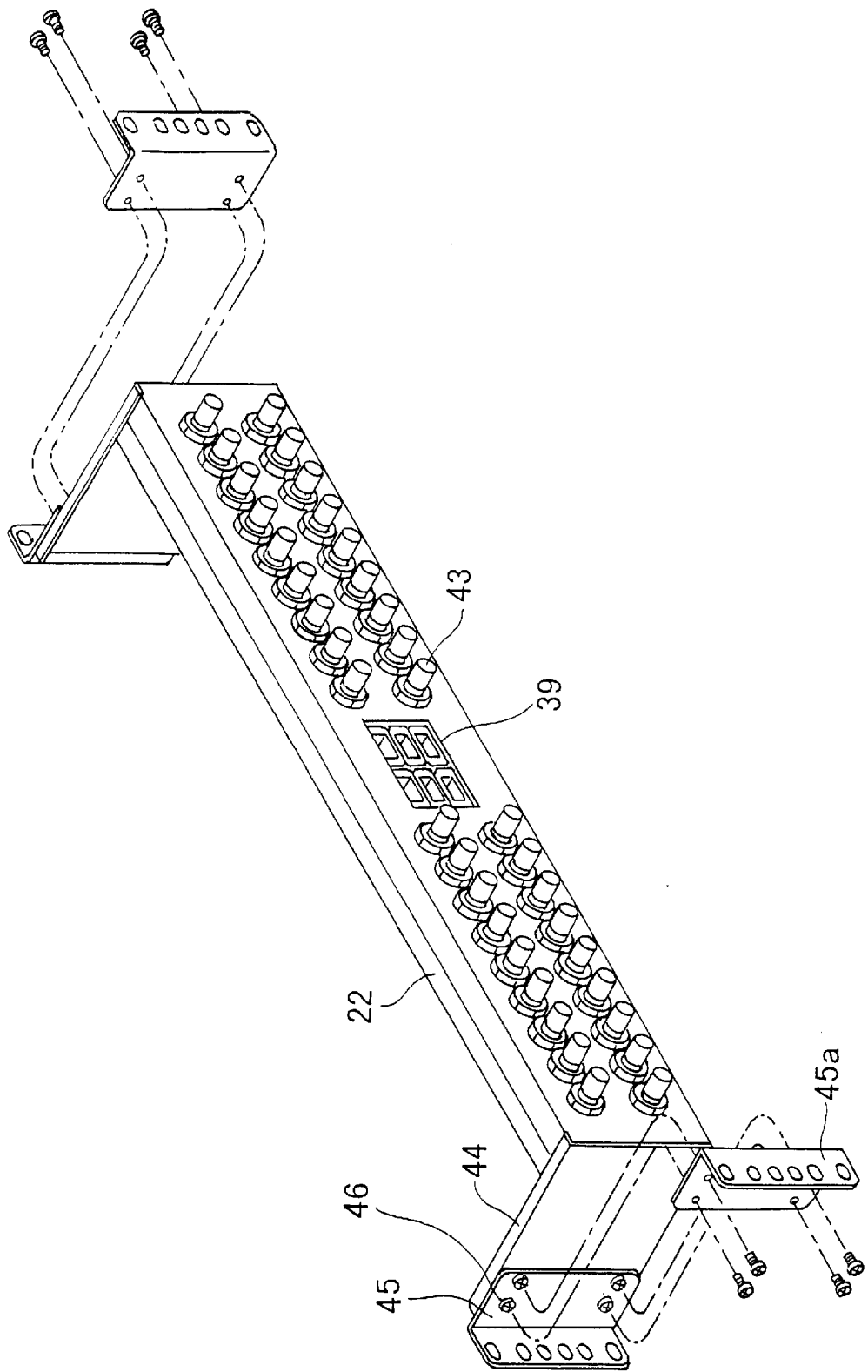
FIG. 8 is a view showing the arrangement of an expansion shelf by way of example.

FIG. 8 shows an example of arrangement of the expansion shelf. The expansion shelf 22 has six connectors 39 located at the center and connected to the DS3 connecting cable 27, and a total of 36 DS3 interface connectors 43 arranged on both sides of the six connectors. Arms 44 are secured to opposite ends of the expansion shelf 22, respectively, and fittings 45 for mounting the expansion shelf to the rack 40 are fixed to the respective arms 44 by screws 46. The fittings 45 can be fixed to the arms 44 with the front side back according to the installation mode of the optical multiplex communication device. Specifically, instead of the fittings 45, fittings 45a directed front side back as shown in FIG. 8 may be screwed to the respective arms 44. The arms 44 permit the expansion shelf 22 to be mounted to the rack 40 so as not to overlap with the vent holes 42 of the shelf body 21.

Figure 9:
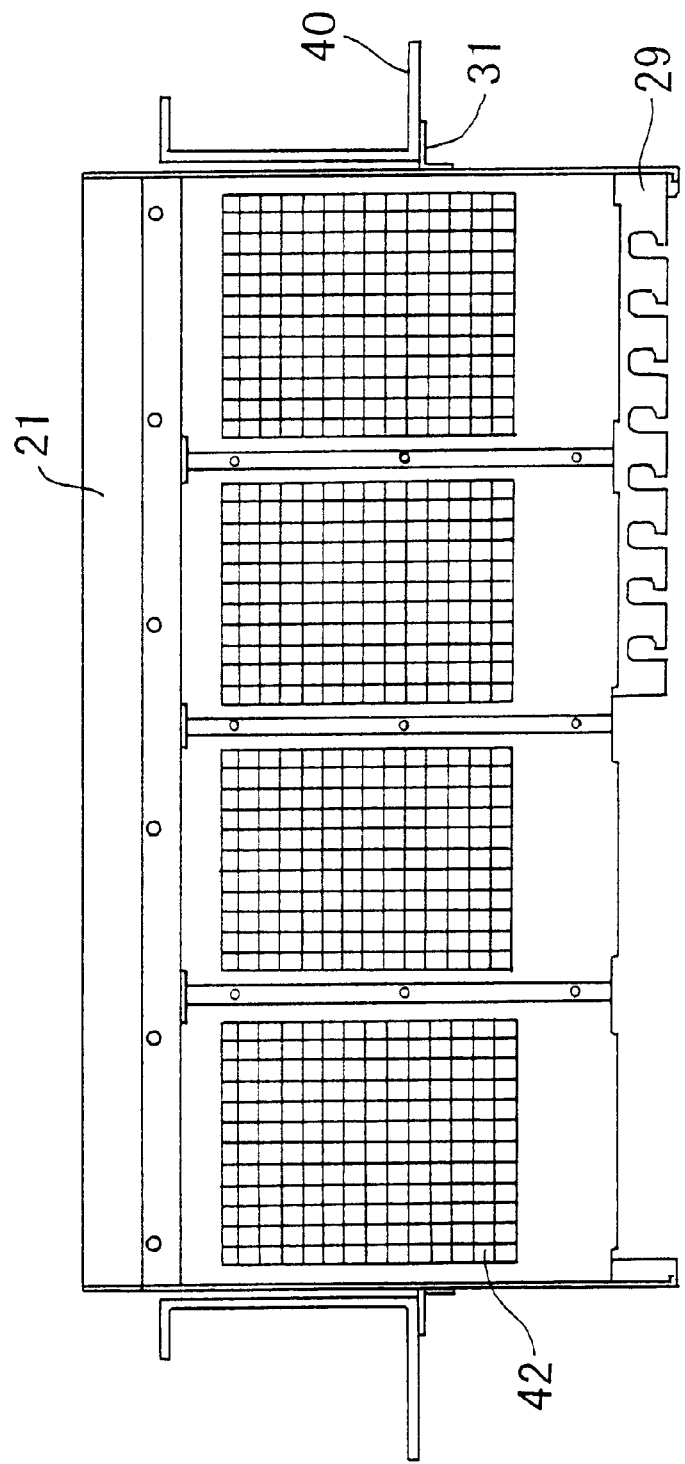
FIG. 9 is a plan view showing the shelf body mounted to a rack.

FIG. 9 is a plan view of the shelf body mounted to the rack. Regardless of whether the device is installed in a remote cabinet or a central office, the shelf body 21 is mounted to the rack 40 by the fittings 31 such that a plug-in unit-mounted side thereof (at which the fiber trays 29 are arranged) is situated in front. The figure clearly shows the vent holes 42 formed in the top face of the shelf body 21.

Figure 10:
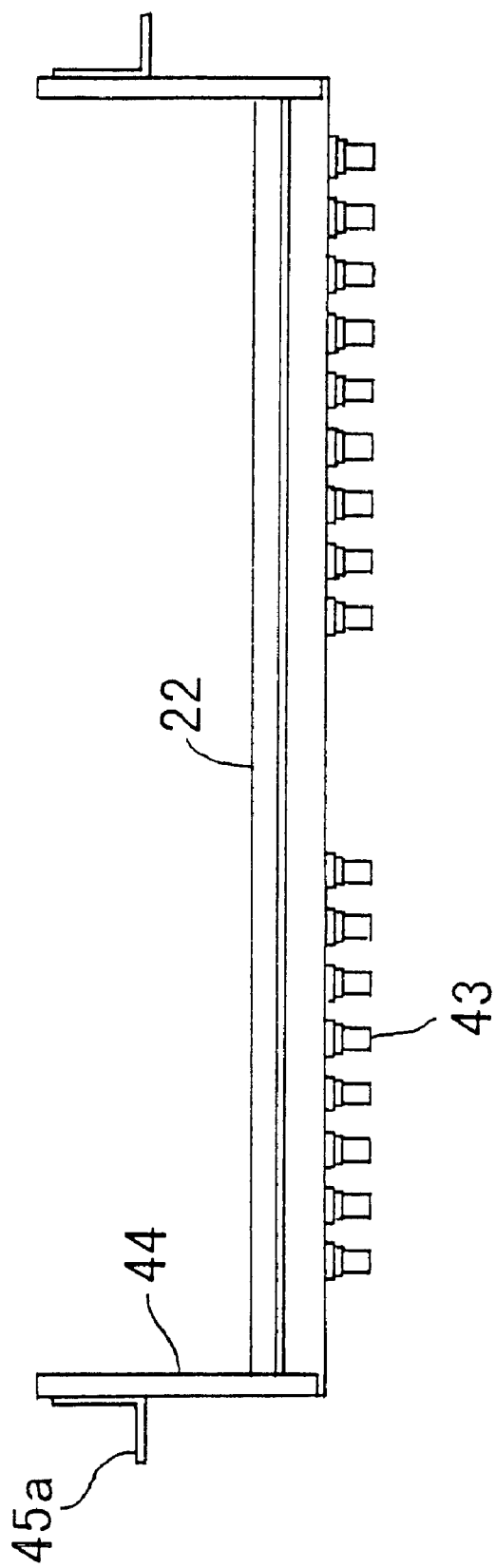
FIG. 10 is a plan view of the expansion shelf used when the device is Installed in a remote cabinet.

FIG. 10 is a plan view of the expansion shelf used when the device is installed in a remote cabinet. In the case where the expansion shelf 22 is installed in a remote cabinet, it is mounted such that a side thereof provided with the DS3 interface connectors 43 is situated in front. In this case, the fittings 45a are fixed to the respective arms 44 such that their mounting faces at which the fittings are directly attached to the rack 40 face the front.

Figure 11:
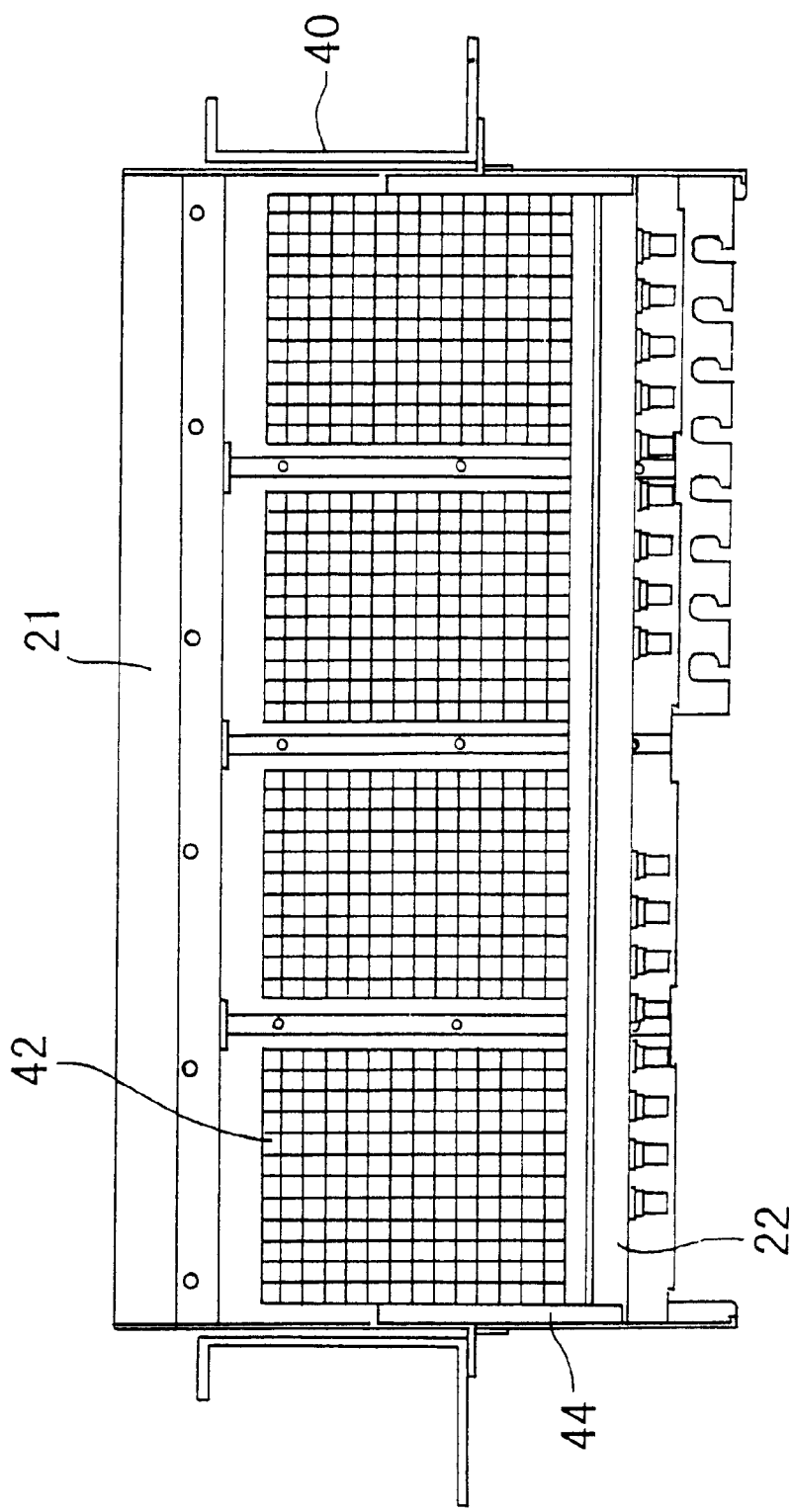
FIG. 11 is a plan view showing how the shelf body and the expansion shelf are mounted to the rack when installed in a remote cabinet.

FIG. 11 is a plan view showing how the shelf body and the expansion shelf are mounted to the rack when installed in a remote cabinet. As illustrated, the expansion shelf 22 is mounted in such a manner as to be shifted toward the front side via the arms 44. This arrangement prevents the vent holes 42 of the shelf body 21 from being covered with the expansion shelf 22 and also permits heat generated in the shelf body 21 to be efficiently dissipated.

Figure 12:
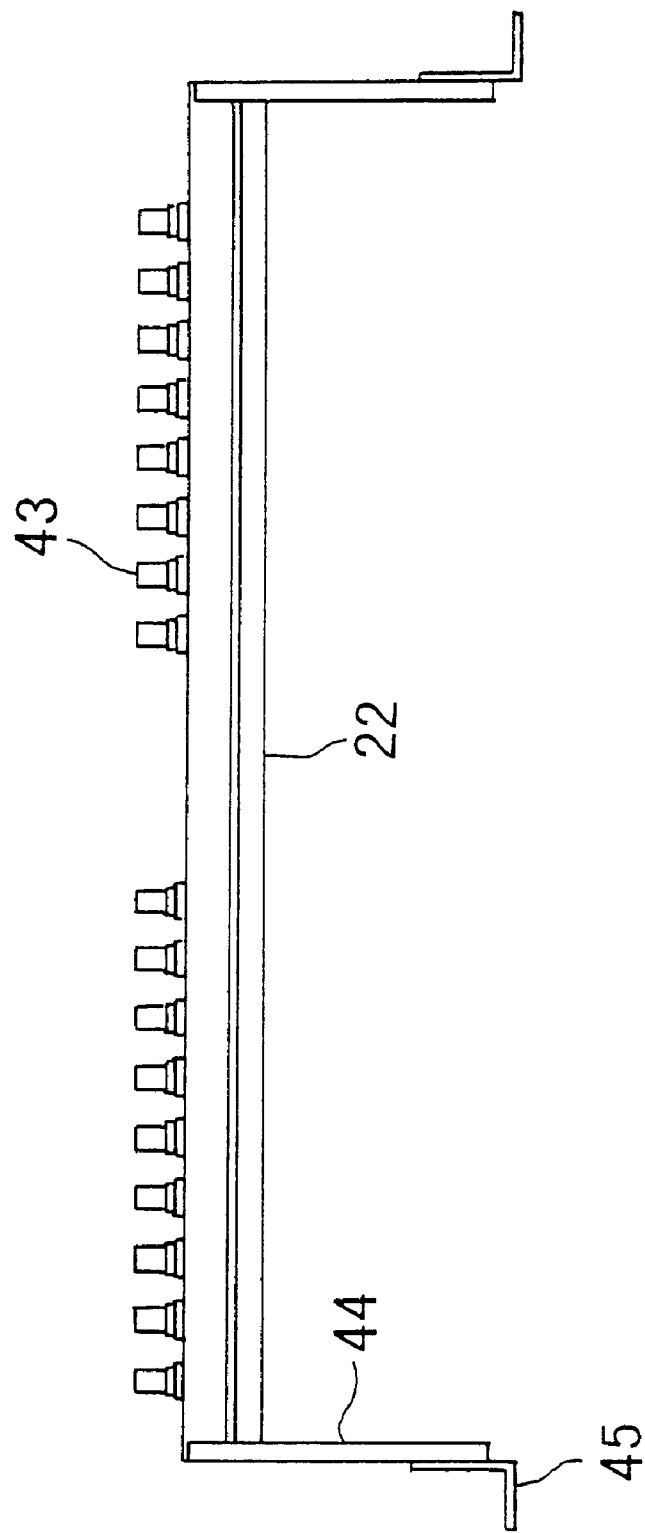
FIG. 12 is a plan view of the expansion shelf used when the device is installed in a central office.

FIG. 12 is a plan view of the expansion shelf used when the device is installed in a central office. In the case where the expansion shelf 22 is installed in a central office, it is mounted such that a side thereof provided with the DS3 interface connectors 43 is situated at the back. In this case, the fittings 45 are fixed to the respective arms 44 such that their mounting faces at which the fittings are directly attached to the rack 40 face the front.

Figure 13:
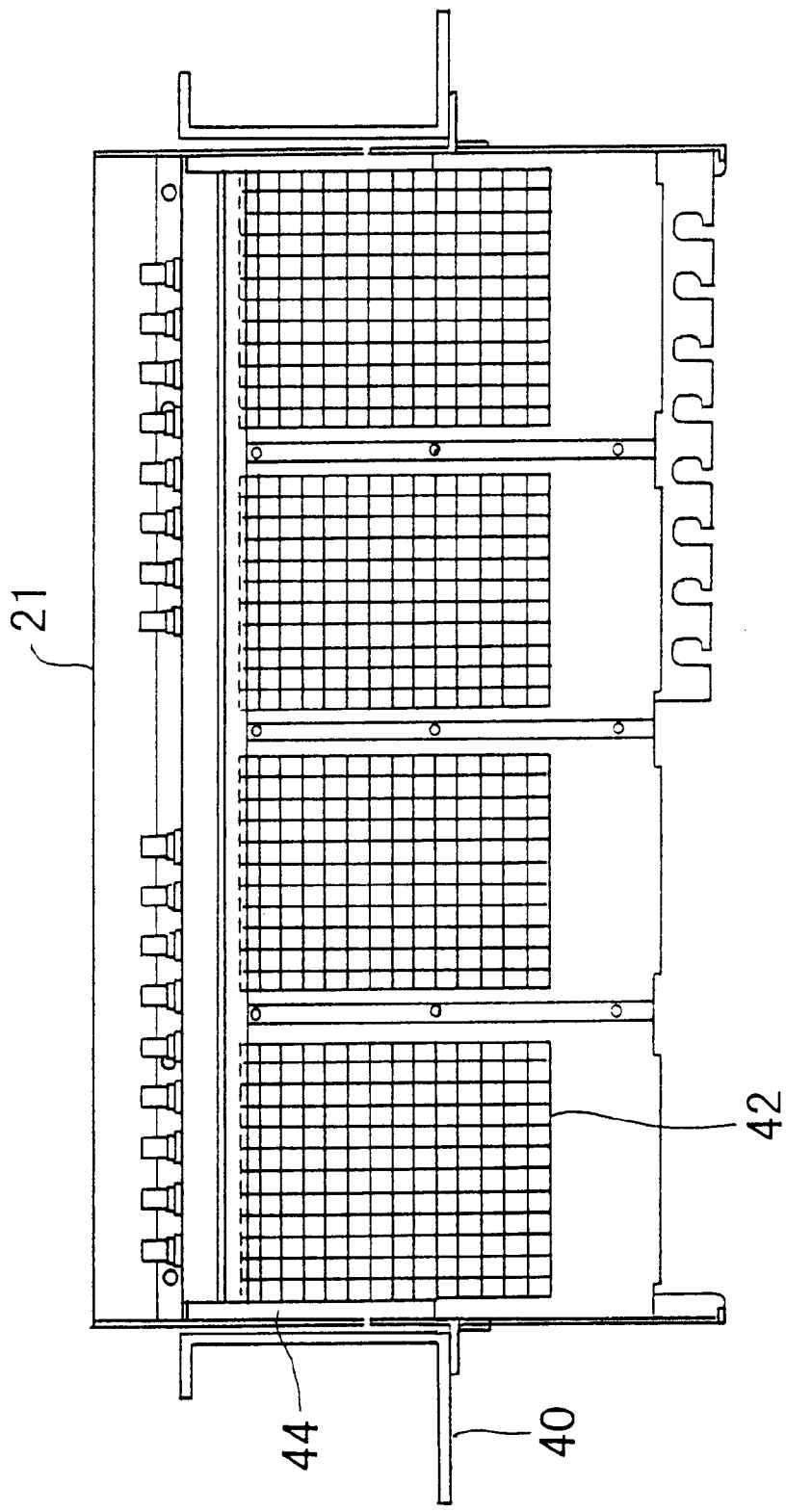
FIG. 13 is a plan view showing how the shelf body and the expansion shelf are mounted to the rack when installed in a central office.

FIG. 13 is a plan view showing how the shelf body and the expansion shelf are mounted to the rack when installed in a central office. As illustrated, the expansion shelf 22 is mounted in such a manner as to be shifted toward the back side via the arms 44. This arrangement prevents the expansion shelf 22 from covering the vent holes 42 of the shelf body 21.

Thus, the fittings 45 for mounting the expansion shelf 22 to the rack 40 can be fixed to the arms 44 with their mounting faces directed in either of opposite directions, so that the expansion shelf permits either the front or rear access and can be conveniently installed in a remote cabinet or a central office.

Also, since the vent holes 42 of the shelf body 21 are not covered with the expansion shelf 22, the expansion shelf 22 and the shelf body 21 can be mounted to the rack 40 with the smallest possible distance therebetween. Accordingly, the overall height of the device becomes 12 U, since the shelf body 21 and the expansion shelf 22 have heights of 10 U and 2 U, respectively. Symbol "U" is a unit of measure of rack height used in North America and is equal to 44.45 millimeters. Thus, the optical multiplex communication device is so compact that a maximum of three devices can be mounted on a rack (height: 42 U) commonly used in North America. In the case of non-redundant arrangement, the expansion shelf 22 is not required, and therefore, the height of the device is 10 U, making the device more compact in size.

An interface plug-in unit improved in the efficiency of handling in the customer interface section 25 will be now described.

Figure 14:
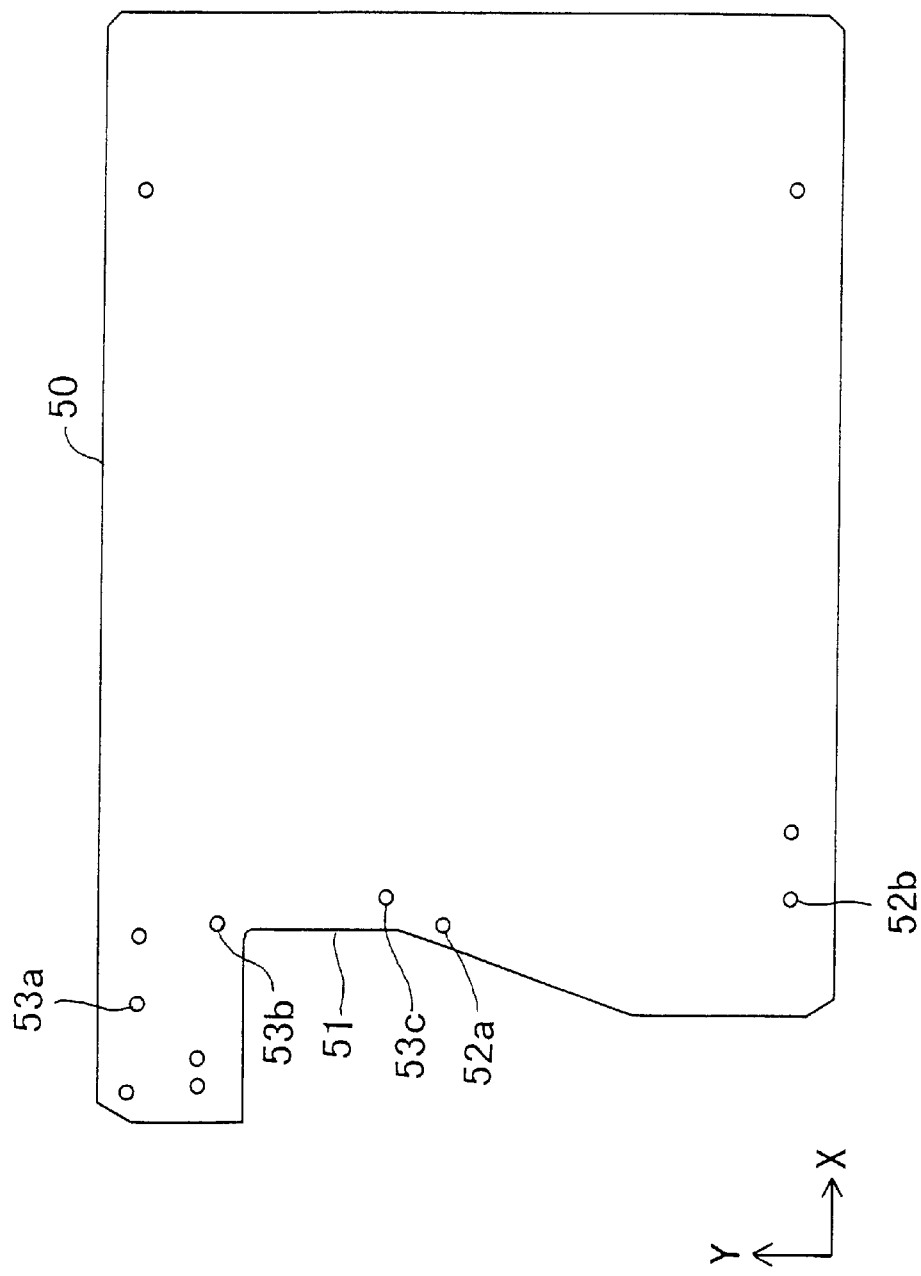
FIG. 14 is a diagram showing the shape of a printed board constituting an optical interface plug-in unit.

FIG. 14 shows the shape of a printed board constituting an optical interface plug-in unit. In the figure, X denotes a direction in which the optical interface plug-in unit 36 is inserted into the customer interface section 25, and direction Y indicates the upside of the device as viewed from the front. A printed board 50 of the optical interface plug-in unit 36 shown in the figure is in a state from which components to be mounted are removed, and has a cutout 51 extending obliquely downward at the front side of the device. Also, the printed board 50 has several holes 52a, 52b and 53a to 53c cut therein to permit two face plates, described later, to be attached thereto by screws or rivets.

Figures 15A, 15B:
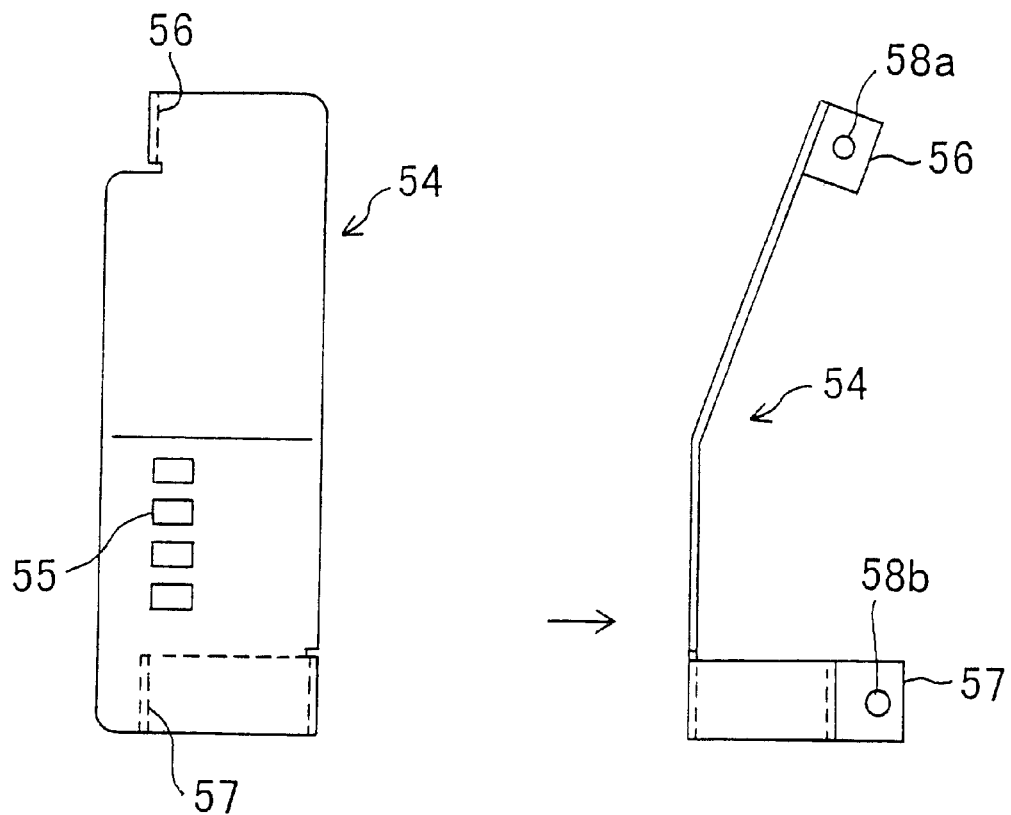

FIGS. 15(A) and 15(B) illustrate a first face plate, wherein FIG. 15(A) is a front view of the first face plate and FIG. 15(B) is a side view of the first face plate. The first face plate 54 is attached to the printed board 50 at a lower front portion thereof along the profile of the cutout 51. Four windows 55 are formed in a front portion of the face plate 54 at a location where an indicator for indicating operation states of the optical interface plug-in unit 36 is arranged. Also, the first face plate 54 has a mounting lug 56 formed by partly bending an upper portion thereof, and a mounting lug 57 similarly formed by partly bending a lower portion thereof. The mounting lugs 56 and 57 have holes 58a and 58b, respectively, and with these holes aligned with the respective holes 52a and 52b cut in the printed board 50, the first face plate 54 is attached to the printed board 50 by using screws or rivets.

Figure 16:
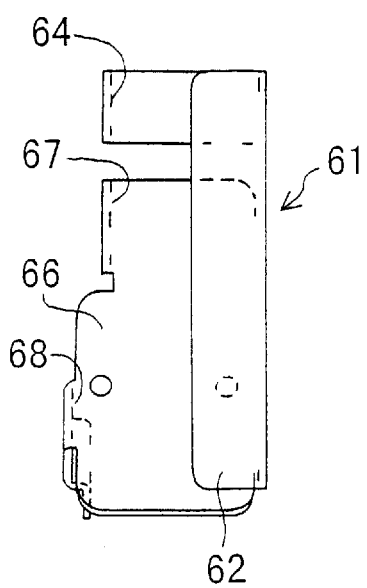
Figure 16:
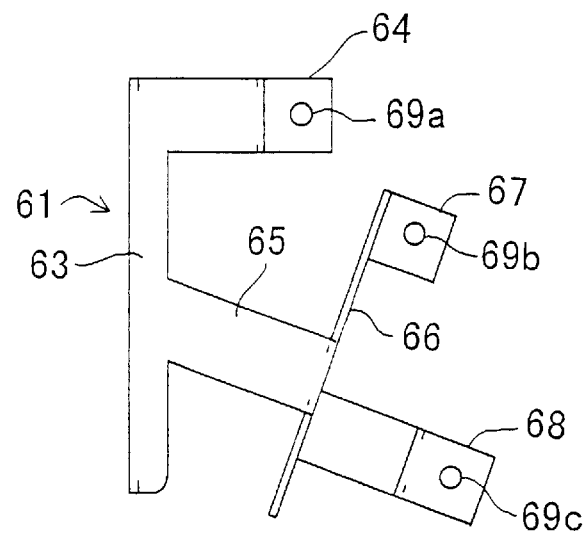
Figure 16:
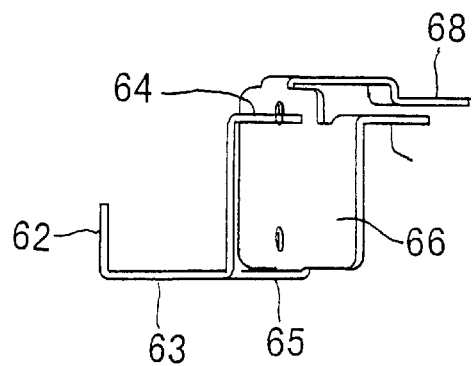

FIGS. 16(A), 16(B) and 16(C) illustrate a second face plate, wherein FIG. 16(A) is a front view of the second face plate, FIG. 16(B) is a side view of the second face plate, and FIG. 16(C) is a plan view of the second face plate. The second face plate 61 is attached to the printed board 50 at an upper front portion thereof and constitutes, in cooperation with the first face plate 54, a front face plate of the optical interface plug-in unit 36 as viewed from the front. Also, the second face plate 61 has the function of holding two optical fiber connectors introduced into the cutout 51.

To this end, the second face plate 61 has a front portion 62 to be situated in front, a side portion 63, a mounting lug 64 formed by bending an extension portion extending from an upper end of the side portion 63, a bridge portion 65 extending from an intermediate portion of the side portion 63, a holder fixing portion 66 for fixing adapter holders, described later, and mounting lugs 67 and 68 extending from the holder fixing portion 66. Holes 69a, 69b and 69c cut in the mounting lugs 64, 67 and 68, respectively, are aligned with the respective holes 53a, 53b and 53c cut in the printed board 50, and using screws or rivets, the second face plate 61 is attached to the printed board 50. The mounting lug 68 is shifted in the thickness direction of the printed board 50 from the mounting lugs 64 and 67 such that the mounting lugs 64 and 67 are attached to an obverse surface (the surface shown in FIG. 14) of the printed board 50 while the mounting lug 68 is attached to a reverse surface of the same.

Figure 17:
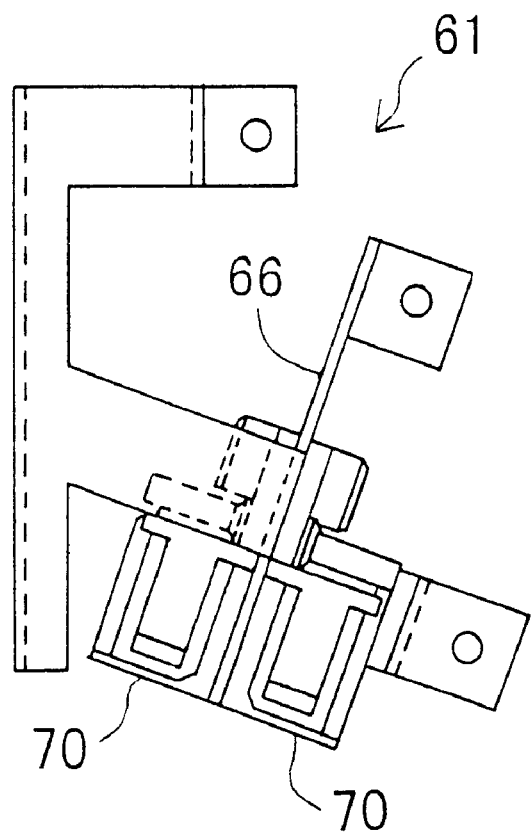
FIG. 17 is a view showing the second face plate to which adapter holders are attached.

FIG. 17 shows the second face plate to which adapter holders are attached. As illustrated, two adapter holders 70 are arranged on both sides of the holder fixing portion 66 of the face plate 61 and are individually fixed to the holder fixing portion 66. The adapter holder 70 is shown in detail in FIGS. 18(A), 18(B) and 18(C).

Figures 18A, 18B:
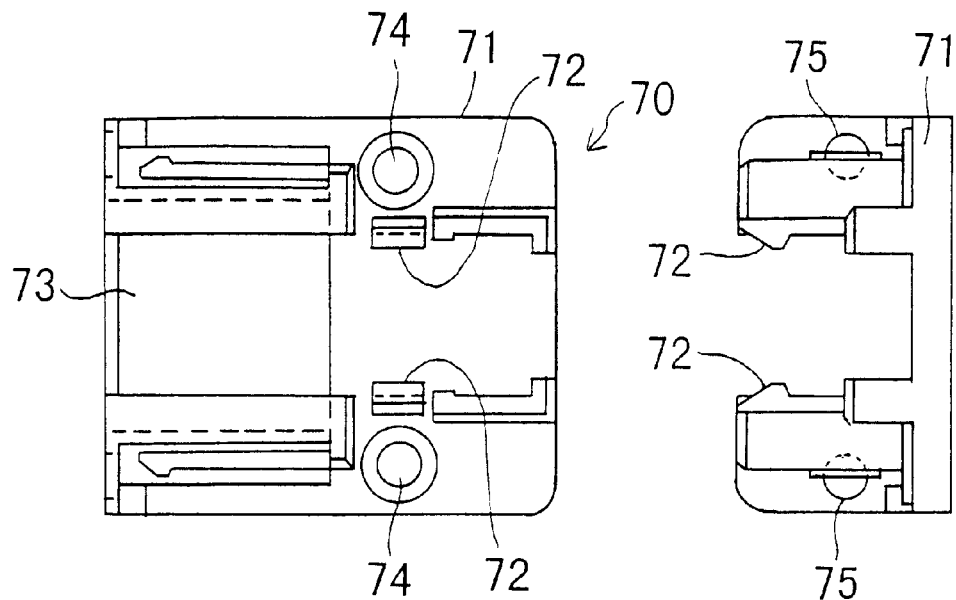
Figure 18C:
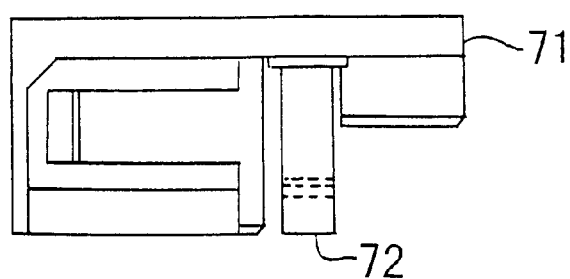

FIGS. 18(A), 18(B) and 18(C) show an example of the adapter holder, wherein FIG. 18(A) is a front view of the adapter holder, FIG. 18(B) is a right side view of the adapter holder, and FIG. 18(C) is a plan view of the adapter holder. The adapter holder 70 has a base member 71, two holding lugs 72 for holding an internal optical connector for an optical fiber extended from an optical module mounted on the optical interface plug-in unit 36, and an adapter receiving portion 73 for receiving an adapter. Holes 74 are cut in the base member 71 to allow the adapter holder to be fixed to the holder fixing portion 66 of the face plate 61 by rivets or the like, and holes 75 are cut in wall portions located on the same side as the adapter receiving portion for fixing an adapter in position.

Figures 19A, 19B:
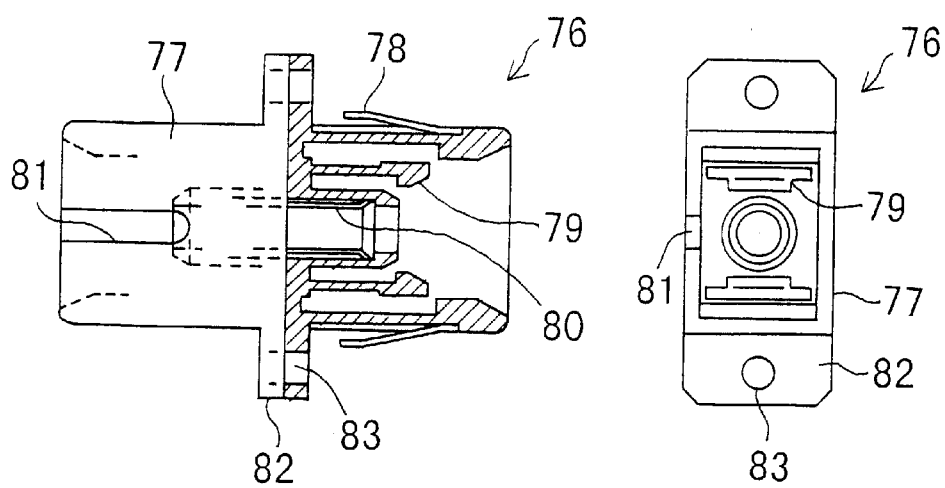

FIGS. 19(A) and 19(B) illustrate an example of the adapter, wherein FIG. 19(A) is a partially sectional front view of the adapter and FIG. 19(B) is a left side view of the adapter. The adapter 76 illustrated in the figure is one used to connect optical connectors of identical type to each other, and comprises a housing 77 which is substantially symmetrical with respect to the longitudinal center, except that leaf springs 78 are formed on one side of the housing 77 at which the adapter 76 is received in the adapter holder 70. The housing 77 has a pair of optical connector engaging portions 79 therein, and a sleeve 80 is located in the center for receiving the ferrule of an optical connector therein for the optical axis alignment of the optical fiber. Also, the housing 77 has keyways 81 continuous with their respective open ends and flanges 82 protruding from a central portion thereof. The flanges 82 have holes 83 cut therein to permit the adapter to be fixed to the adapter holder 70.

Figure 20:
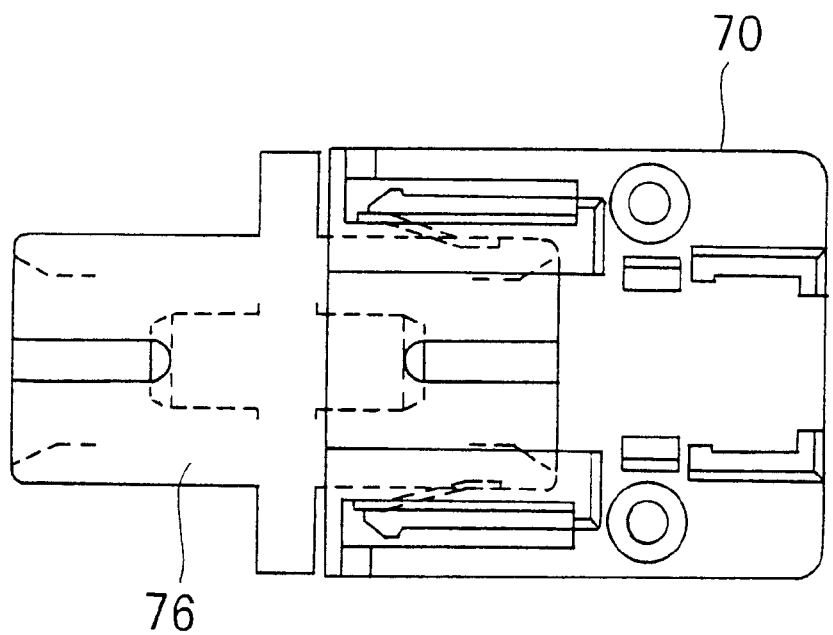
FIG. 20 is a view showing the adapter received in the adapter holder.

FIG. 20 shows a state in which the adapter is received in the adapter holder. As the adapter 76 is inserted into the adapter receiving portion 73 of the adapter holder 70, it is positioned approximately at the center of the adapter receiving portion 73 due to the elastic forces of the leaf springs 78. While in this state, the adapter 76 is fixed to the adapter holder 70 by using rivets or the like inserted through the holes 83 of the adapter 76 and the holes 75 of the adapter holder 70.

Figure 21:
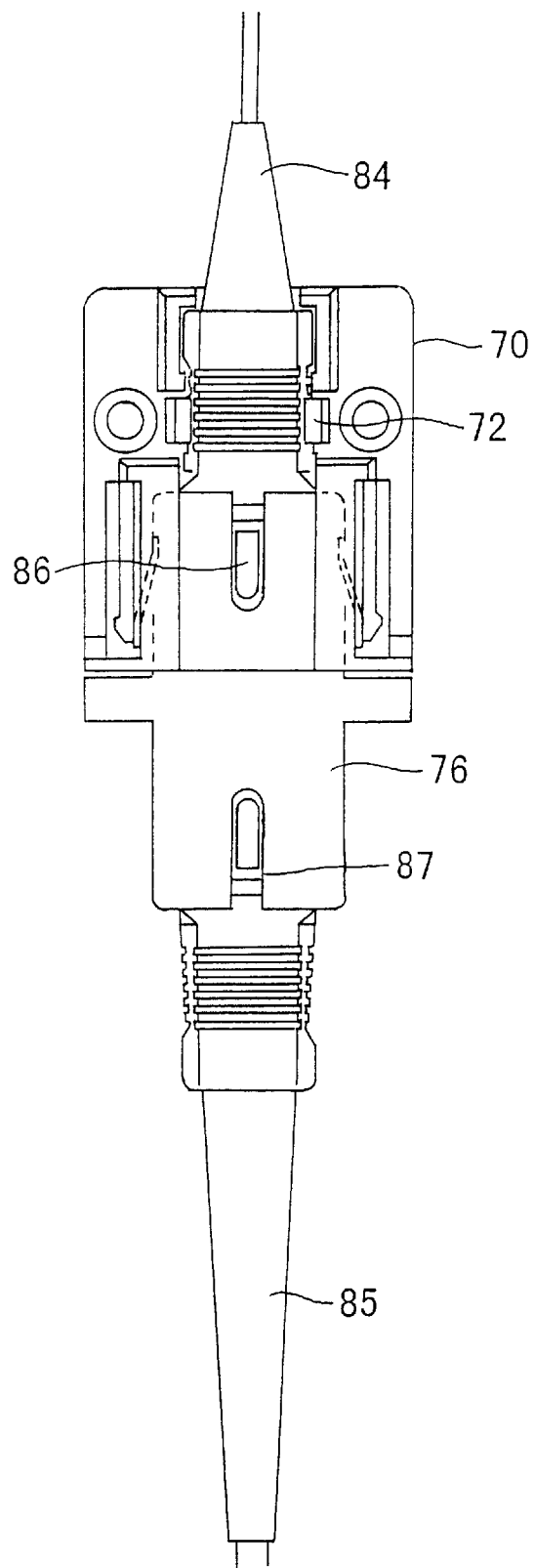
FIG. 21 is a view showing optical connectors connected to each other by means of the adapter.
Figure 22:
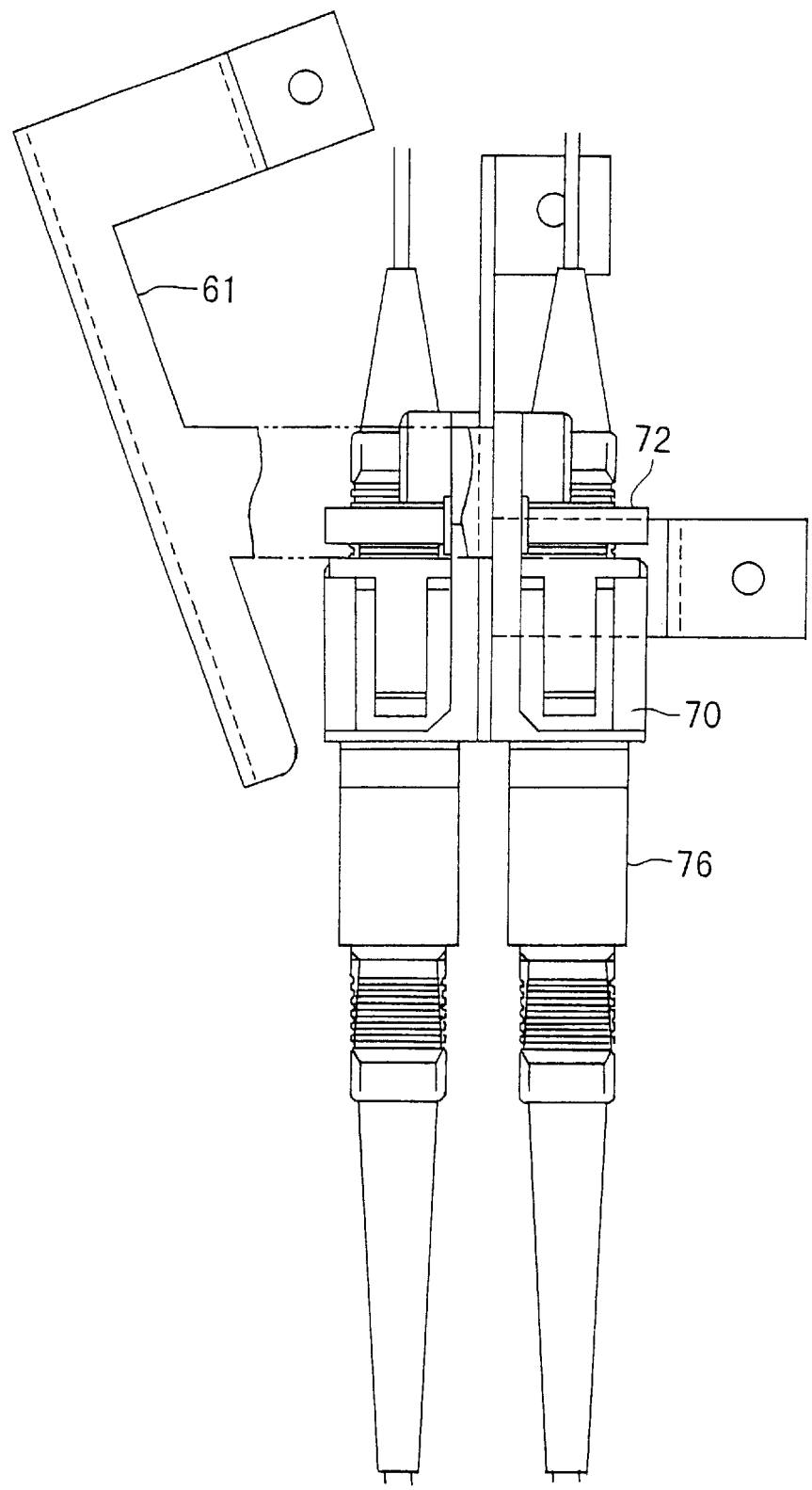
FIG. 22 is a view showing connected optical connectors held by the face plate.

FIG. 21 shows a state in which optical connectors are connected to each other by means of the adapter, and FIG. 22 shows a state in which the thus-connected optical connectors are held by the face plate. An internal optical connector 84 and an external optical connector 85 are inserted into the adapter 76 such that keys 86 and 87 protruding from respective bodies of the internal and external optical connectors 84 and 85 are fitted in the respective keyways 81 formed on the opposite sides of the adapter 76. As a consequence, the distal ends of the ferrules inserted from opposite sides of the adapter 76 are pressed against each other under a suitable pressure inside the sleeve 80 of the adapter, whereby the cores of the optical fibers are optically coupled to each other.

Figure 23:
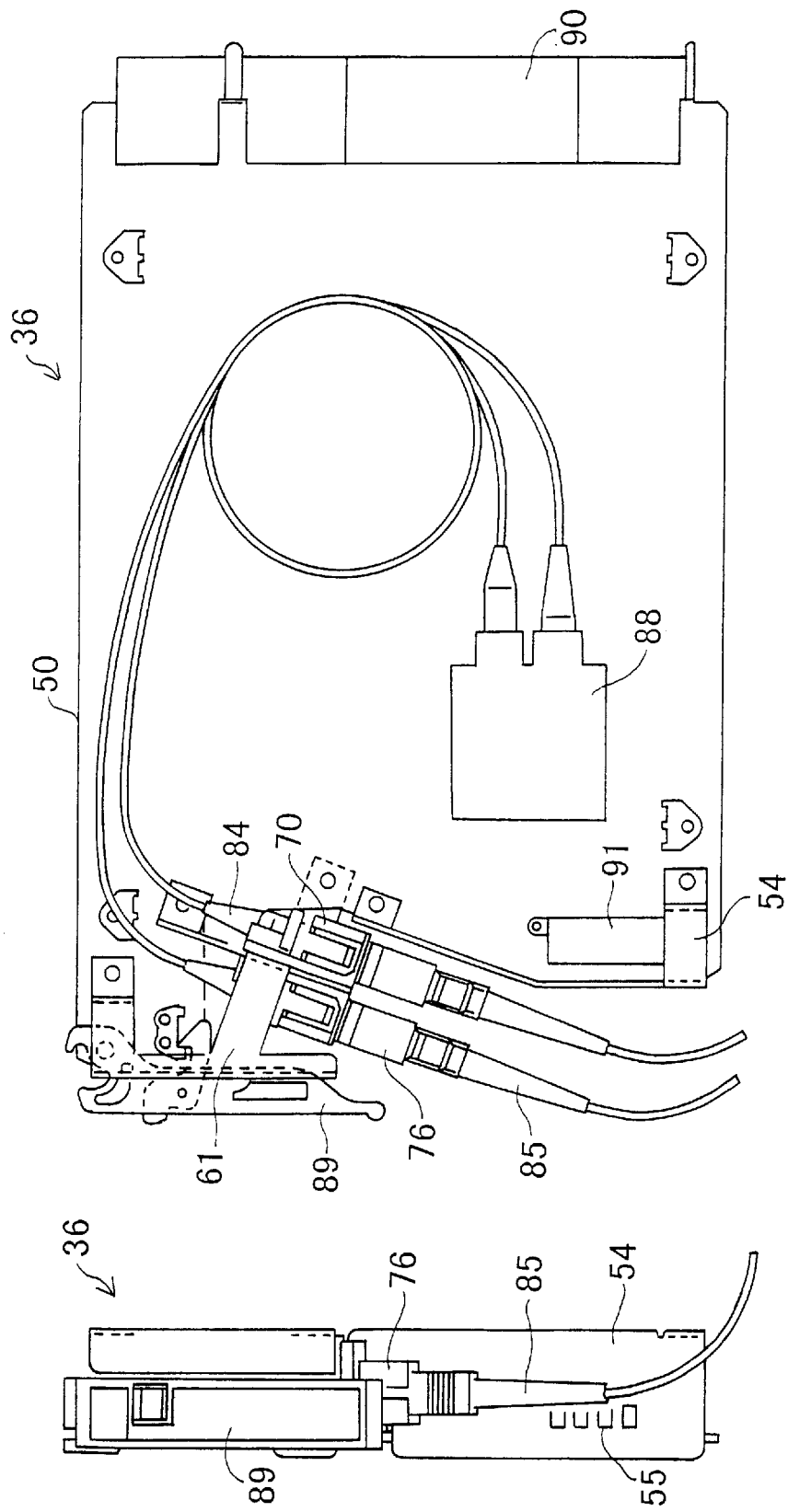

FIGS. 23(A) and 23(B) are views showing the optical interface plug-in unit, wherein FIG. 23(A) shows the optical interface plug-in unit as viewed from the front of the device, and FIG. 23(B) shows the optical interface plug-in unit as viewed from one side of the device. These figures clearly show the optical interface plug-in unit 36 whose adapters 76 held by the second face plate 61 are positioned in the cutout 51 formed in the printed board 50 at the front side of the device. Each adapter 76 receives at one end the internal optical connector 84 of the optical cable extended from an optical module 88 mounted on the printed board 50 and receives at the other end the external optical connector 85. In practice, the external optical connector 85 is inserted after the optical interface plug-in unit 36 is mounted to the shelf body 21.

Also, the optical interface plug-in unit 36 has a large-sized card lever 89 attached to the second face plate 61, and connectors 90 mounted to the printed board 50 at the back thereof. Further, an indicator 91 for indicating operation states is mounted on the printed board 50 behind the windows 55 of the first face plate 54.

Figure 24:
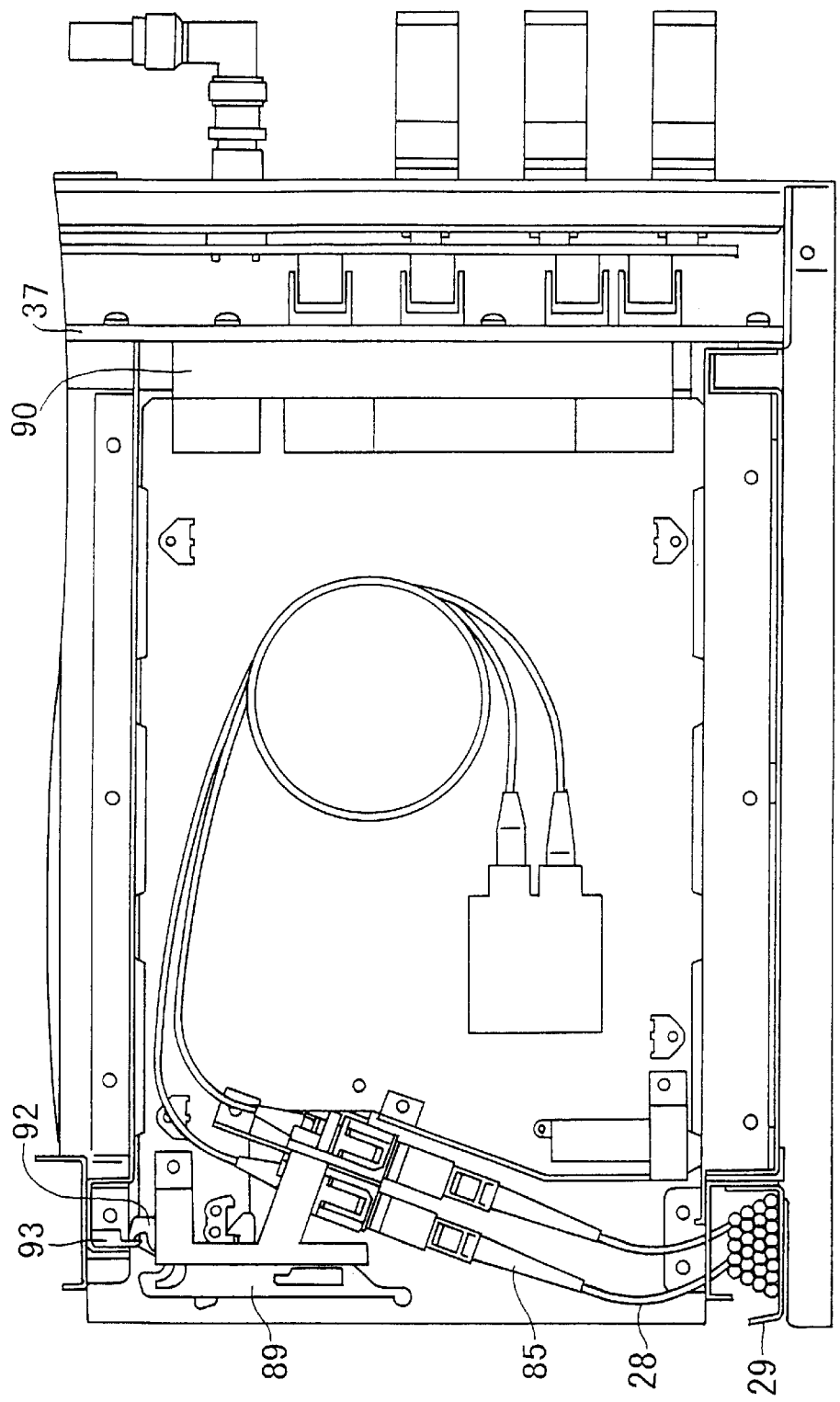
FIG. 24 is a view showing a mounted state of the optical interface plug-in unit.

FIG. 24 illustrates a mounted state of the optical interface plug-in unit. The figure shows the unit received in the lower one of the two shelves of the customer interface section 25. As the optical interface plug-in unit 36 is mounted to the customer interface section 25 of the shelf body 21, the connectors 90 of the printed board 50 become connected to pin terminals provided on the main back wiring board 37, whereby electrical connections with other plug-in units and connectors are achieved. In this case, a claw 92 of the card lever 89 engages with a stopper 93 of the shelf body 21, thereby preventing detachment of the optical interface plug-in unit 36.

Also, the fiber tray 29 is arranged below the opening of the shelf body 21, to which the optical interface plug-in unit 36 is mounted, and extends horizontally up to the side wall of the device. The fiber tray 29 allows the optical fibers 28 extending from the external optical connectors 85 to be placed thereon in order and to be guided to the outside of the shelf body 21. The fiber tray is provided for each of the two shelves of the customer interface section 25 and the transport section 26 and is used in common.

Figure 25A:
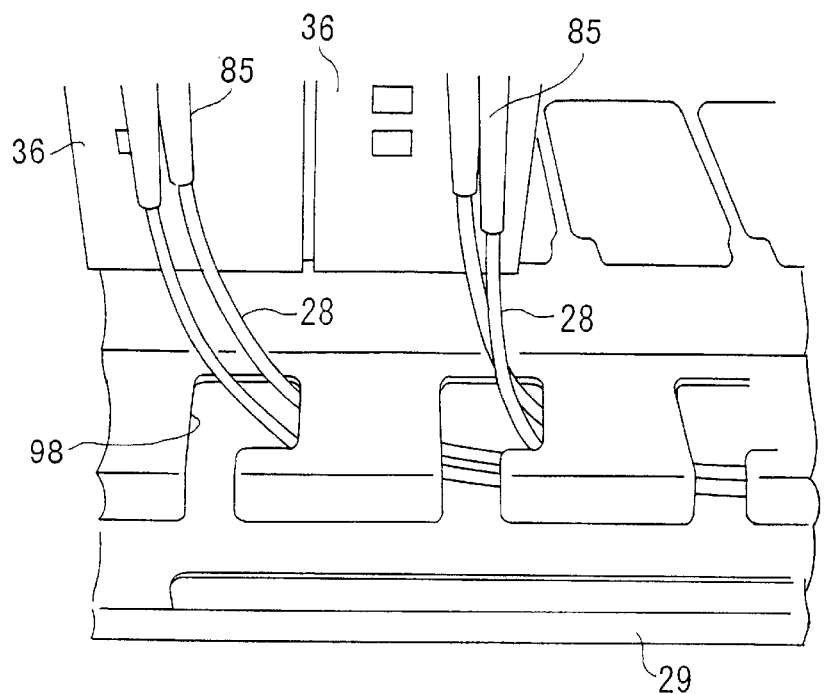
Figure 25B:
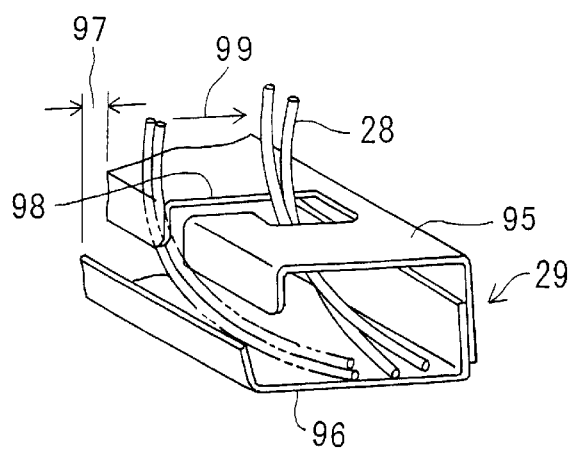
Figure 26:
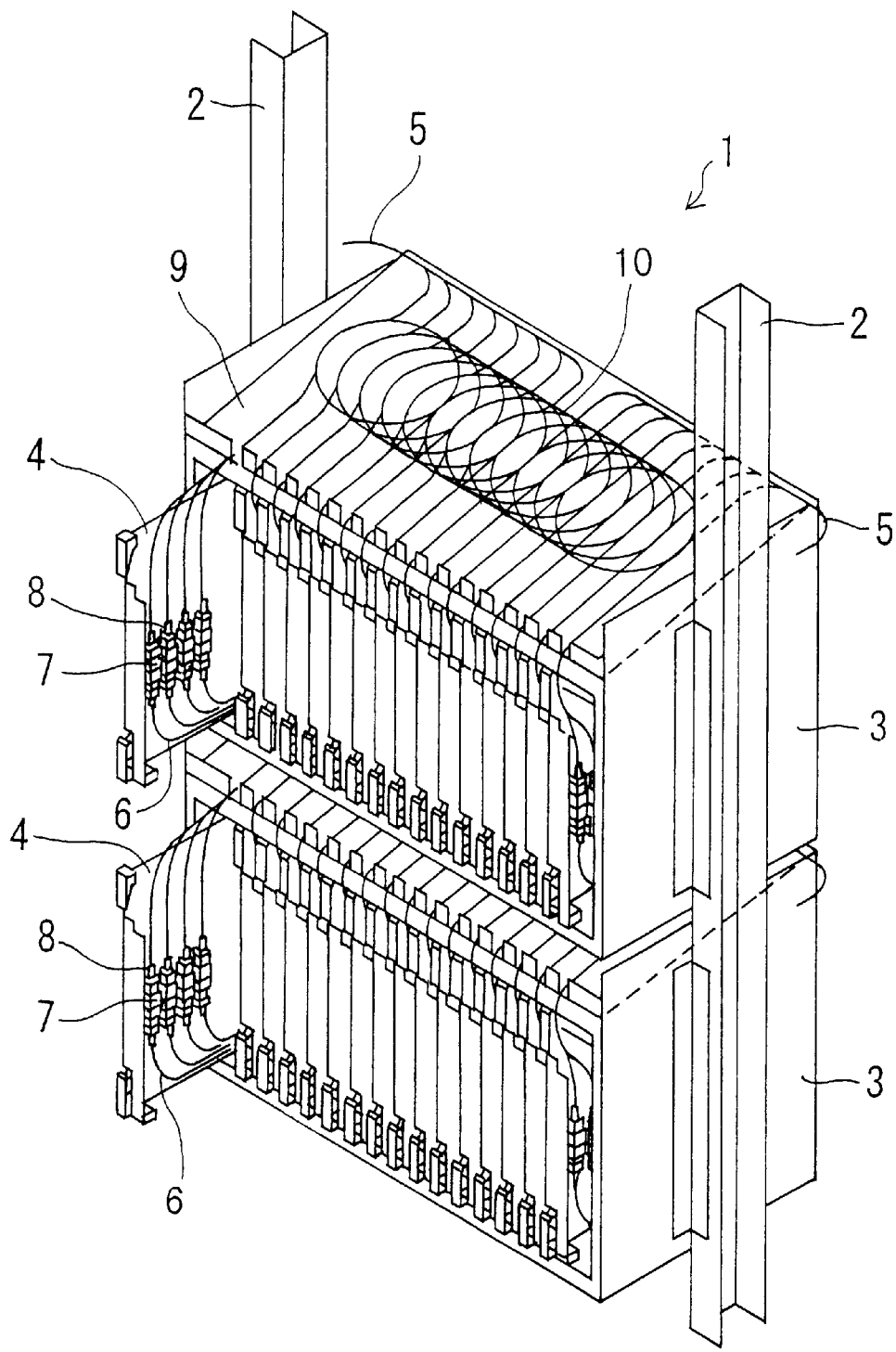
FIG. 26 is a view showing an example of arrangement of a conventional optical multiplex communication device.
Figure 27:
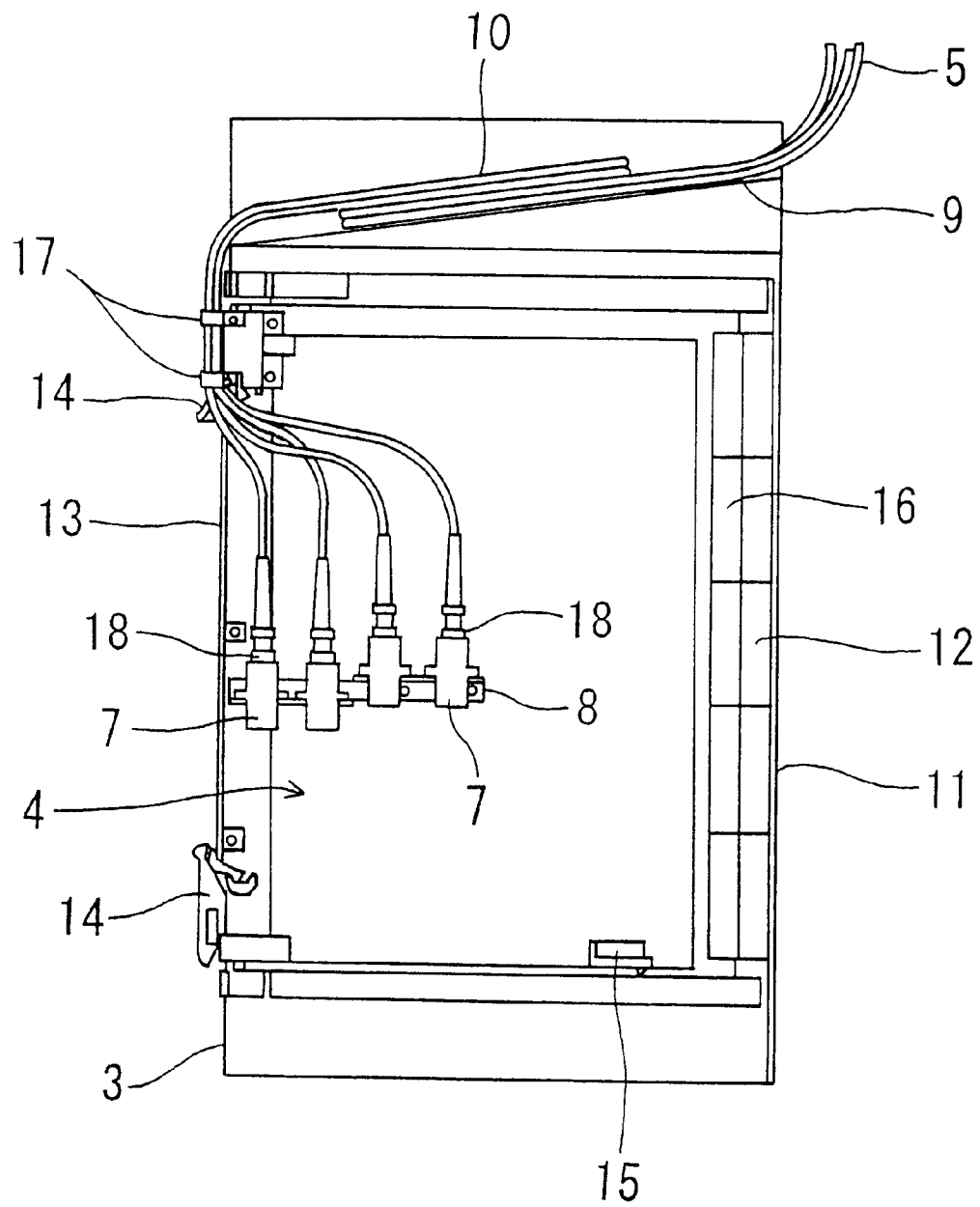
FIG. 27 is a sectional side view of a principal part of the communication device, showing a state in which a printed board unit is received.
Figure 28:
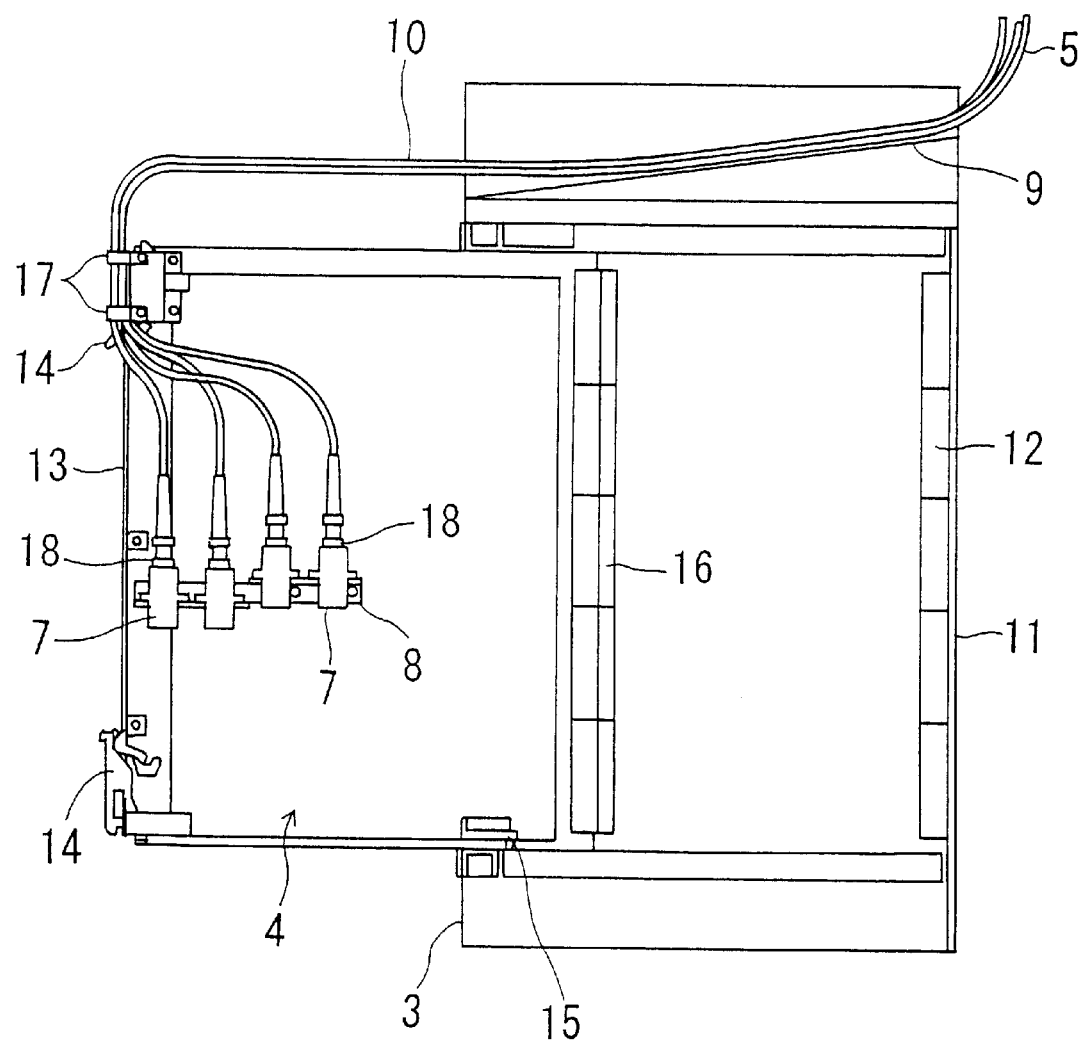
FIG. 28 is a sectional side view of the principal part of the communication device, showing a state in which the printed board unit is pulled out.

FIGS. 25(A) and 25(B) illustrate details of the fiber tray, wherein FIG. 25(A) is an enlarged view of part of the fiber tray as viewed from the front of the device, and FIG. 25(B) is a perspective view of part of the fiber tray. The fiber tray 29 is formed by combining upper and lower channeled rails 95 and 96 having an overall cross section of generally C shape. The upper channeled rail 95 is smaller in width than the lower channeled rail 96 such that a stepped portion 97 is formed on the front side of the device. The stepped portion 97 defines an opening through which the optical fibers 28 can be introduced into the fiber tray 29. Also, L-shaped cutouts 98 are formed in the upper channeled rail 95 at locations where the corresponding optical fibers 28 hang down. Each L-shaped cutout extends from the front side of the device and is bent in a direction toward an outlet of the optical fibers 28.

To put the optical fibers 28 extending from the optical interface plug-in unit 36 into the fiber tray 29, near-connector portions of the optical fibers 28 close to the plug-in unit are introduced into the fiber tray 29 through the front-side opening of the corresponding L-shaped cutout 98 and then the remaining portions of the optical fibers 28 are put into the fiber tray 29 through the opening defined by the stepped portion 97. Subsequently, the near-connector portions of the optical fibers 28 are shifted to the inside of the L-shaped cutout 98, as indicated by arrow 99, and the optical fibers 28 are pulled into the fiber tray 29. Consequently, the optical fibers 28 can be kept in the fiber tray 29 with their near-connector portions engaged with the L-shaped cutout 98.

As described above, the present invention has a construction such that DS3 interface connectors for additional 18 channels, which are required only in the non-redundant arrangement, are mounted on the expansion shelf. This makes it unnecessary to increase the size of the shelf itself, and in the case of the redundant arrangement, the expansion shelf may be detached, whereby a compact device can be provided.

Also, the device is constructed such that optical fibers can be introduced from obliquely below and connected to the plug-in units in the shelf. Thus, when the optical fibers are connected/disconnected, such connection/disconnection work can be performed without the need to pull out the plug-in unit, whereby the working efficiency is remarkably enhanced.

Further, the fiber trays are arranged at the center and bottom levels, respectively, with respect to the height of the shelf body, and the widths of the upper and lower channeled rails constituting each fiber tray are made different from each other such that a stepped portion is formed. With this arrangement, optical fibers extending from the plug-in units can be easily received in the fiber trays.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A heterogeneous functions-integrated communication device for accommodating a plurality of interface plug-in units in either a redundant or non-redundant arrangement for operation, said communication device comprising:

a shelf body having a back face, an upper portion and a capacity for accommodating a maximum number of interface plug-in units, a plurality of shelf body interface connectors provided on said back face for accommodating said maximum number of interface plug-in units in a redundant arrangement for operation;

an expansion shelf attached to said upper portion of said shelf body;

a plurality of expansion shelf interface connectors provided on said expansion shelf for accommodating said maximum number of interface plug-in units in a non-redundant arrangement for operation; and means for communicating between said shelf body and said expansion shelf to accommodate communications between said interface plug-in units and both of said shelf body interface connectors and said expansion shelf interface connectors in a non-redundant arrangement of operation.

2. The heterogeneous functions-integrated communication device according to claim 1, wherein said expansion shelf has fittings attached to both sides thereof, the fittings being attachable in either of opposite directions so that said expansion shelf may be mounted to a rack with an interface connector-mounted surface thereof directed to a front or back of the communication device.

3. The heterogeneous functions-integrated communication device according to claim 2, wherein said expansion shelf has arms, the arms being attached at one end to the both sides of said expansion shelf for positioning the interface connector-mounted surface of said expansion shelf at a front or back side of the communication device, the fittings being attached to other ends of the arms, respectively, in a manner such that the fittings can be directed in either of the opposite directions.

4. The heterogeneous functions-integrated communication device according to claim 1, wherein the interface plug-in units each comprise a printed board having a cutout extending obliquely downward at a front side of the communication device, first and second face plates and a card lever attached to the printed board at the front side of the communication device, an adapter holder situated in the cutout and held by the first face plate, and an adapter held by the adapter holder, for connecting an optical fiber extended from an optical module mounted on the printed board to an optical fiber which is accessed from obliquely below through a space between the first and second face plates.

5. The heterogeneous functions-integrated communication device according to claim 1, wherein said shelf body has two shelves for mounting the interface plug-in units.

6. The heterogeneous functions-integrated communication device according to claim 5, wherein said shelf body has fiber trays located below the respective shelves at a front side of the communication device, each of the fiber trays horizontally extending up to a side wall of said shelf body, for receiving optical fibers in order which are accessed to the interface plug-in units from obliquely below.

7. The heterogeneous functions-integrated communication device according to claim 6, wherein the fiber trays each comprise a lower channeled rail on which the optical fibers are placed, and an upper channeled rail smaller in width than the lower channeled rail and arranged above the lower channeled rail, a difference in width between the upper and lower channeled rails creating a stepped portion through which the optical fibers are introduced.

8. The heterogeneous functions-integrated communication device according to claim 7, wherein the upper channeled rail has L-shaped cutouts formed therein, the optical fibers connected to the interface plug-in units being introduced into the L-shaped cutouts from the front side of the communication device and shifted in a direction toward the side wall such that the optical fibers are engaged with the L-shaped cutouts.

* * * * *